United States Patent
Sodeyama et al.

(10) Patent No.: US 12,128,560 B2
(45) Date of Patent: Oct. 29, 2024

(54) INFORMATION PROCESSING DEVICE, CONTROL METHOD, AND PROGRAM

(71) Applicant: SONY CORPORATION, Tokyo (JP)

(72) Inventors: Yoshinao Sodeyama, Tokyo (JP); Tetsuya Narita, Tokyo (JP); Yasuhiro Matsuda, Tokyo (JP); Kazuo Hongo, Chiba (JP); Toshimitsu Tsuboi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 732 days.

(21) Appl. No.: 17/279,990

(22) PCT Filed: Sep. 12, 2019

(86) PCT No.: PCT/JP2019/035825
§ 371 (c)(1),
(2) Date: Mar. 25, 2021

(87) PCT Pub. No.: WO2020/071080
PCT Pub. Date: Apr. 9, 2020

(65) Prior Publication Data
US 2021/0394362 A1    Dec. 23, 2021

(30) Foreign Application Priority Data
Oct. 5, 2018    (JP) .................... 2018-190285

(51) Int. Cl.
*B25J 9/16*    (2006.01)
*B25J 13/08*   (2006.01)

(52) U.S. Cl.
CPC ............. *B25J 9/1612* (2013.01); *B25J 9/163* (2013.01); *B25J 9/1633* (2013.01); *B25J 9/1661* (2013.01); *B25J 9/1697* (2013.01); *B25J 13/085* (2013.01)

(58) Field of Classification Search
CPC ........ B25J 9/1612; B25J 9/163; B25J 9/1633; B25J 9/1661; B25J 9/1697; B25J 13/085
See application file for complete search history.

(56) References Cited

U.S. PATENT DOCUMENTS 7,822,508 B2 * 10/2010 Sugiyama .............. B25J 9/1641
                                                318/568.12
10,471,591 B1 * 11/2019 Hinkle ................... B25J 9/1612
(Continued)

FOREIGN PATENT DOCUMENTS

CN    101239467 A    8/2008
CN    205058045 U    3/2016
(Continued)

OTHER PUBLICATIONS

Satoru Shibata et al., Handing Motion of a Aobot to a Human Including Cooperation and Positioning Support, Japan Society of Kansei Engineering, Feb. 2010, vol. 9, No. 2, pp. 227-234.
(Continued)

*Primary Examiner* — Kira Nguyen
(74) *Attorney, Agent, or Firm* — Paratus Law Group, PLLC

(57) ABSTRACT

It is possible to transfer an object smoothly. An information processing device includes a control unit (12, 11) that controls a manipulator so that a moving speed of an object gripped by the manipulator maintains continuity when the object is transferred to a transfer target person.

21 Claims, 17 Drawing Sheets

(56) References Cited

U.S. PATENT DOCUMENTS

| | | | | |
|---|---|---|---|---|
| 11,235,463 | B2* | 2/2022 | Inaba | B25J 13/08 |
| 2004/0140787 | A1* | 7/2004 | Okamoto | B25J 9/1612 |
| | | | | 318/568.21 |
| 2007/0135962 | A1* | 6/2007 | Kawabe | G10L 13/00 |
| | | | | 704/E15.045 |
| 2007/0239315 | A1* | 10/2007 | Sato | B25J 9/1612 |
| | | | | 700/245 |
| 2011/0166709 | A1* | 7/2011 | Kim | B25J 9/1612 |
| | | | | 700/260 |
| 2013/0144440 | A1* | 6/2013 | Shimizu | B25J 11/0005 |
| | | | | 700/262 |
| 2019/0176348 | A1* | 6/2019 | Bingham | B25J 9/1697 |
| 2019/0337152 | A1* | 11/2019 | Homberg | B25J 9/1653 |

FOREIGN PATENT DOCUMENTS

| | | |
|---|---|---|
| CN | 107639634 A | 1/2018 |
| CN | 108248845 A | 7/2018 |
| CN | 108297068 A | 7/2018 |
| JP | 2009-012132 A | 1/2009 |
| JP | 2013-111737 A | 6/2013 |
| JP | 2013-184273 A | 9/2013 |
| KR | 20080065281 A | 7/2008 |
| KR | 20110000689 A | 1/2011 |
| KR | 20170061686 A | 6/2017 |
| KR | 20170101754 A | 9/2017 |
| KR | 20170107875 A | 9/2017 |

OTHER PUBLICATIONS

Kajikawa et al., Receiver Robot's Motion for Handing-over with a Human, Proceedings of the 2002 IEEE International Workshop on Robot and Human Interactive Communication, Sep. 25-27, 2002, pp. 494-499, Berlin, Germany.

Kajikawa et al., Motion Planning for Hand-Over between Human and Robot, Proceedings 1995 IEEE/RSJ International Conference on Intelligent Robots and Systems. Human Robot Interaction and Cooperative Robots, Aug. 5-9, 1995, pp. 193-199, Pittsburgh, PA.

Shibata et al., An Analysis of The Process of Handing Over An Object and Its Application to Robot Motions, 1997 IEEE International Conference on Systems, Man, and Cybernetics. Computational Cybernetics and Simulation, Oct. 12-15, 1997, pp. 64-69, Orlando, FL.

* cited by examiner

INFORMATION PROCESSING DEVICE, CONTROL METHOD, AND PROGRAM

CROSS REFERENCE TO PRIOR APPLICATION

This application is a National Stage Patent Application of PCT International Patent Application No. PCT/JP2019/035825 (filed on Sep. 12, 2019) under 35 U.S.C. § 371, which claims priority to Japanese Patent Application No. 2018-190285 (filed on Oct. 5, 2018), which are all hereby incorporated by reference in their entirety.

FIELD

The present disclosure relates to an information processing device, a control method, and a program.

BACKGROUND

In recent years, robots for executing interactions with humans in homes, nursing care facilities, stores, or the like have been actively developed. The interactions between the humans and the robots include, for example, conversations, transfer of objects, or the like.

CITATION LIST

Patent Literature

Patent Literature 1: JP 2013-111737 A

SUMMARY

Technical Problem

Here, in the transfer of the object, delicate control is required according to an object which is a target to be transferred or a behavior, a situation, or the like of a person who is a transfer target, in order to achieve smooth transfer of the object.

Therefore, the present disclosure proposes an information processing device, a control method, and a program that enable smooth transfer of an object.

Solution to Problem

To solve the above-described problem, an information processing device according to one aspect of the present disclosure comprises: a control unit that controls a manipulator so that a moving speed of an object gripped by the manipulator maintains continuity when the object is transferred to a transfer target person.

(Action) According to an information processing device according to an embodiment of the present disclosure, a manipulator is controlled so that continuity of a moving speed of an object in a transfer direction is maintained when the object is transferred to a transfer target person. Therefore, a sudden change in displacement of the object in the transfer direction can be reduced, and it becomes thus possible to transfer the object smoothly.

DESCRIPTION OF EMBODIMENTS

Figure 1:
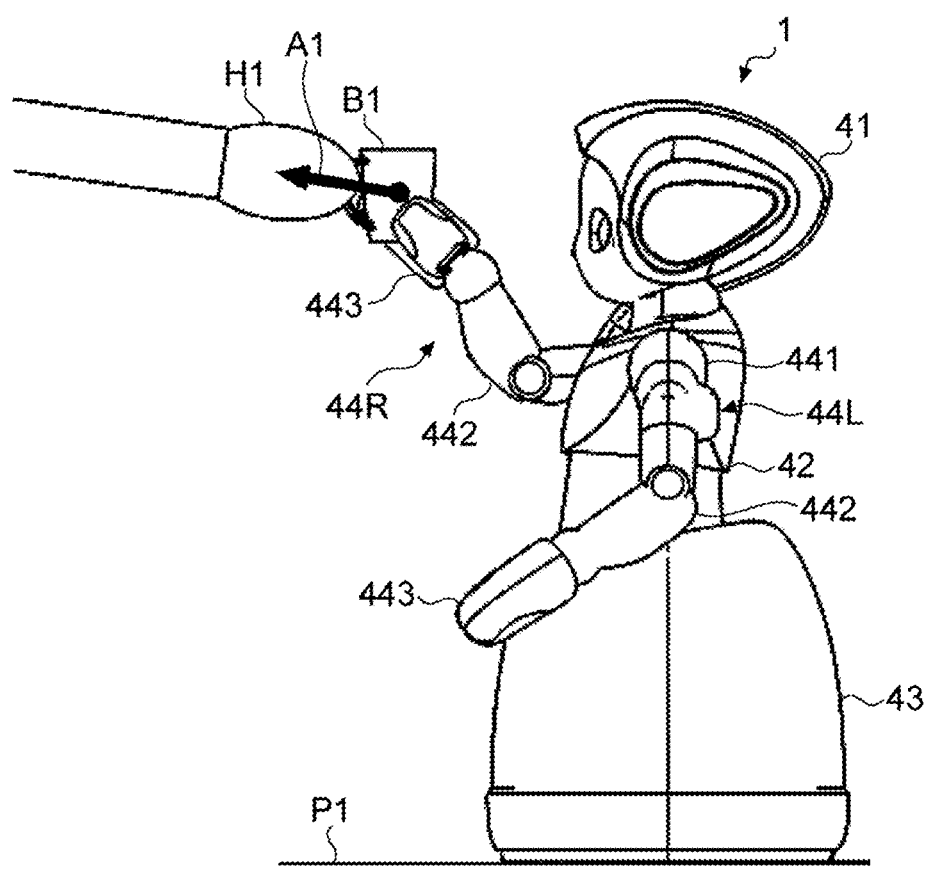
FIG. 1 is a schematic diagram for describing an operation of handing an object from an autonomous robot according to an embodiment to a transfer target person.

Hereinafter, embodiments of the present disclosure will be described in detail with reference to the drawings. Note that in each of the following embodiments, the same portions will be denoted by the same reference numerals and an overlapping description thereof will be omitted.

In addition, the present disclosure will be described in the following item order.

1. Embodiment
1.1 Overview of autonomous robot
1.2 With respect to transfer operation of object
1.3 Schematic configuration of autonomous robot
1.4 Configuration of hand portion
1.5 Functional components of autonomous robot
1.6 With respect to machine learning of transfer action
1.7 Operation example
1.8 Specific example of transfer operation
1.8.1 First example
1.8.2 Second example
1.8.3 Third example
1.8.4 Fourth example
1.9 With respect to blend between grip operation and release operation
1.9.1 Modification
1.10 With respect to measurement of initial slip
1.10.1 Vision sensor
1.10.2 Pressure distribution sensor
1.11 System configuration
1.12 Action/effect

1. Embodiment

Hereinafter, an information processing device, a control method, and a program according to an embodiment of the present disclosure will be described in detail with reference to the drawings. In the present embodiment, an information processing device, a control method, and a program that enable a physical interaction that exchanges an unknown object between an autonomous robot having an arm (also referred to as a manipulator) such as a robot hand, a humanoid robot, a pet robot, or the like, and a person to be smoothly performed will be described by way of example.

1.1 Overview of Autonomous Robot

FIG. 1 is a schematic diagram for describing an operation of handing an object from an autonomous robot according to the present embodiment to a person (hereinafter, referred to as a transfer target person). As illustrated in FIG. 1, the autonomous robot 1 is, for example, a humanoid robot including a head portion 41, a body portion 42, a carriage portion 43, and manipulators 44L and 44R. The body portion 42 and the carriage portion 43 constitute, for example, a moving body that can move on a floor P1 or the like.

The carriage portion 43 accommodates, for example, a traveling motor, a battery, a control unit, or the like, in addition to a traveling mechanism such as a wheel, a caterpillar, or the like. However, the traveling mechanism is not limited to the wheel, the caterpillar, or the like, and may be a walking mechanism or the like including two or more legs and the like. In addition, the autonomous robot 1 is not limited to the humanoid robot, and various robots having at least one arm portion, such as a manipulator alone, an autonomous moving body equipped with a manipulator, or the like, can also be applied as the autonomous robot 1.

Each of the manipulators 44L and 44R (hereinafter, their reference numerals are simply 44 in a case where the manipulators 44L and 44R are not distinguished from each other) includes an upper arm portion 441 attached to a place corresponding to a shoulder of the body portion 42, a forearm portion 442 attached to the upper arm portion 441 at a place corresponding to an elbow of the manipulator 44, and a hand portion 443 attached to the forearm portion 442 at a place corresponding to a wrist of the manipulator 44. The upper arm portion 441 and the forearm portion 442 constitute, for example, an arm portion in the manipulator 44. Each of joints corresponding to the shoulder, the elbow, and the wrist of the manipulator 44 is provided with, for example, a drive unit, a joint mechanism, or the like for moving the manipulator 44 like an arm of a person. As the drive unit, for example, an electromagnetic motor, a hydraulic actuator, a pneumatic actuator, or the like, can be used.

In addition, the hand portion 443 is also provided with a finger portion as a mechanism for gripping an object. Note that a case where the hand portion 443 has two fingers will be exemplified in the following description, but the number of fingers of the hand portion 443 is not limited thereto, and various modifications such as three fingers, four fingers, five fingers, or the like, can be made. In addition, a hand using jamming transition, a hand using suction by air pressure control, or the like, can also be used as the hand portion 443.

1.2 With Respect to Transfer Operation of Object

Figure 2:
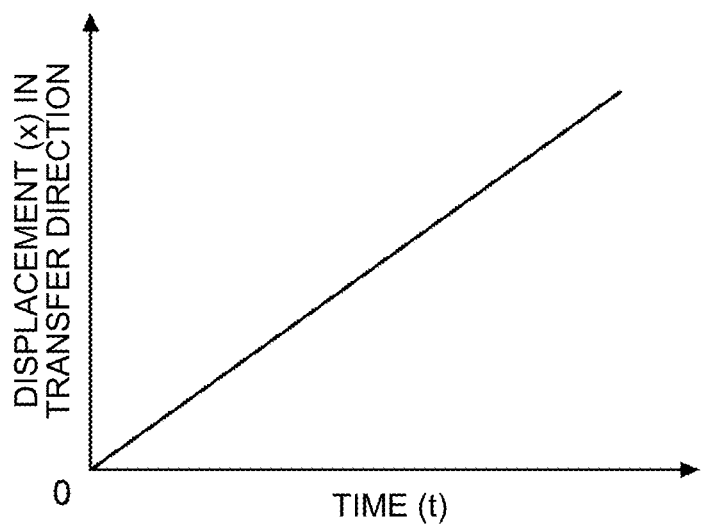
FIG. 2 is a graph illustrating an example of an optimal transfer operation in the embodiment.
Figure 3:
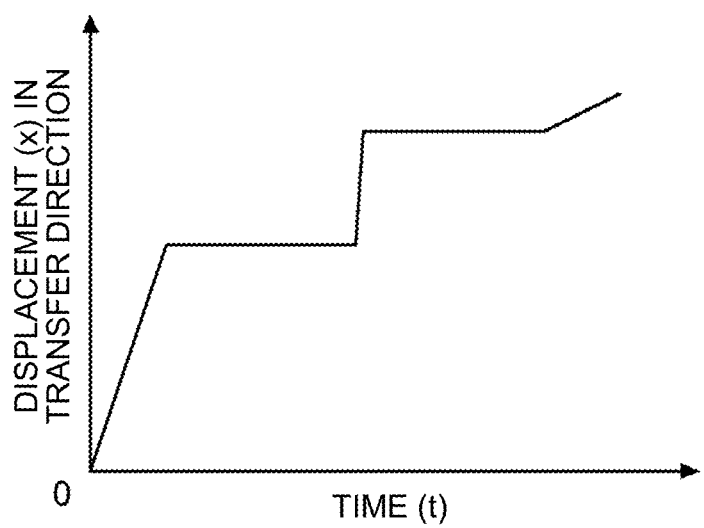
FIG. 3 is a graph illustrating an example of a non-optimal transfer operation in the embodiment.

In such an autonomous robot 1, in a case where an object B1 gripped by the hand portion 443 is handed to a hand H1 of the transfer target person, it is preferable that displacement of the object B1 in a transfer direction A1 is continuous, for example, linear during an execution period of a transfer operation, as illustrated in FIG. 2. On the other hand, as illustrated in FIG. 3, in a case where the displacement of the object B1 in the transfer direction A1 during the execution period of the transfer operation includes a sudden change, there is a high possibility that the object B1 cannot be successfully transferred from the hand portion 443 to the hand H1 of the transfer target person, such that an event that the object B1 falls or contents of the object B1 spills will occur.

The transfer operation of the object between the person and the autonomous robot includes a grip operation in which the autonomous robot grips the object, a release operation in which the autonomous robot releases the object, and a receiving operation in which the person receives the object, and the autonomous robot 1 releases the object gripped by the grip operation by the release operation at the time of transferring the object to the person. That is, at the time of transferring the gripped object to the person, the autonomous robot 1 changes a blend ratio between the grip operation and the release operation to gradually increase a proportion of the release operation, and finally releases the object.

Here, for example, the release operation executed by the autonomous robot does not have a predetermined pattern, and an optimal release operation differs for each object or each transfer target person. For example, the optimal release operation differs between a case of transferring a teacup in which hot water is put and a case of transferring a tennis ball.

This is because a movement amount of the object B1 in the transfer direction A1 per unit time changes depending on a magnitude of an external force applied to the object B1 by the transfer target person in the receiving operation, but this change in the movement amount differs depending on a difference in characteristics peculiar to the object B1, for example, a coefficient of static friction, a coefficient of dynamic friction, a mass, a shape dimension, a rigidity, a strength, a temperature, a humidity, and the like.

For this reason, it is difficult for a designer of the autonomous robot to plan the optimal release operations in advance for all objects having different characteristics. Similarly, it is difficult for the designer to plan the optimal release operations in advance for all cases in which behaviors, situations, or the like of the transfer target person are different from each other.

Here, in the present embodiment, a configuration and an operation that enable a high-quality physical interaction, specifically, the transfer of the object, between the person and the autonomous robot in an environment in which the object which is a target to be transferred is unknown or an environment in which a behavior, a situation, or the like of the transfer target person is unknown, such as a home, a nursing care facility, a store, or the like, where the person and the autonomous robot coexist, that is, an environment where it is not possible to create a model of the optimal release operation in advance will be described with specific examples.

For example, in the present embodiment, by utilizing information from various sensors mounted on the autonomous robot 1, it is possible to perform the optimal transfer operation according to the object B1 to be transferred or the behavior, the situation, or the like of the transfer target person.

Note that in the present description, the optimal transfer operation may be, for example, that a change rate in a slip amount in the transfer direction at the time of transferring the object maintains continuity (see, for example, FIG. 2). However, the optimal transfer operation is not limited thereto, and various transfer operations in which the transfer target person can receive the object from the autonomous robot 1 without stress can be defined as the optimal transfer operation.

On the other hand, an improper transfer operation may be, for example, an operation that leads to an event such as an event that a large force more than necessary is generated when the transfer target person receives the object from the autonomous robot 1, an event that a force causing deformation, damage, jumping-out of contents, or the like, of the object, is generated when the transfer target person has received the object from the autonomous robot 1, or the like.

In addition, the improper transfer operation can include an operation in which the transfer target person stops receiving the object by taking more time than necessary for the release operation, or as a result, a fall of the object or jumping-out of contents of the object is generated.

In a case where such improper transfer operations are performed, an external force more than necessary or disturbance is generated in the autonomous robot 1, and a change rate in a slip amount in the transfer direction of the object becomes discontinuous (see, for example, FIG. 3). In addition, in a case where the improper transfer operation is performed, the change rate in the slip amount in the transfer direction of the object is intermittent, which also causes the change rate in the slip amount in the transfer direction of the object to be discontinuous.

Therefore, in the present embodiment, for example, machine learning using a change rate of a grip force of the hand portion 443, information detected by various sensors mounted on the hand portion 443, or the like, as an input and using continuity of a moving speed of the object B1 in the transfer direction A1 as an output is performed. Therefore, it is possible to enable smooth transfer of the object B1 depending on characteristics (a coefficient of static friction, a coefficient of dynamic friction, a mass, a shape dimension, a rigidity, a strength, a temperature, a humidity, and the like) of the object B1 and the behavior, the situation, or the like of the transfer target person.

In addition, in the present embodiment, for example, a change in a slip amount or an initial slip amount of the object B1 gripped by the hand portion 443 is measured, and the release operation is started when the change includes a component in a direction different from a gravity direction, for example, a component in a direction opposite to gravity, a direction opposite to a rotational moment due to the gravity, or the transfer direction A1 (for example, a position direction of the hand H1 of the transfer target person). Therefore, the release operation can be started at an initial stage of the transfer operation, and a fluctuation in a load applied to the object B1 or the grip force of the hand portion 443 can thus be suppressed to the minimum, such that it becomes possible to transfer the object B1 more smoothly.

Further, in the present embodiment, in order to further improve a quality of a physical interaction, in addition to the above, the existence, a change in an emotion, or the like, of the transfer target person obtained from image input information, voice input information, or the like may be added to the input or the output of machine learning.

For example, the release operation may be started after confirming the existence of the transfer target person or the existence of the hand H1 using a result of image processing or information from a distance measuring sensor. Therefore, it is possible to avoid erroneously starting the release operation, and it becomes thus possible to more safely and reliably execute the transfer of the object B1. Note that the existence of the transfer target person may be confirmed using, for example, voice input/output information or the like as well as the result of the image processing or the information from the distance measuring sensor. In addition, after an intention of the transfer target person to grip the object or a change in an emotion of the transfer target person during the release operation is recognized using the voice input/output information or the like, determination of start of the release operation or operation continuation may be executed.

Furthermore, for example, by continuously measuring the change in the slip amount of the object B1 in the transfer direction A1 during the execution of the release operation, the release operation may be controlled so that the continuity of the moving speed of the object B1 in the transfer direction A1 is maintained. Therefore, the sudden change in the displacement of the object B1 in the transfer direction A1 can be reduced, and it becomes thus possible to transfer the object B1 more smoothly.

Furthermore, for example, during the execution of the release operation, a slip amount or an initial slip amount of the object B1 in the gravity direction may be continuously measured. Therefore, it becomes possible to reduce an erroneous fall of the object B1 or unnatural vertical displacement of the object B1 within the hand portion 443.

Note that in the present description, the transfer direction A1 is defined as, for example, a direction of the carpal bone on a line connecting an upper end of the metacarpal bone of a third finger and the carpal bone to each other after recognizing a position, a posture, and a shape of the hand H1 of the transfer target person. In addition, it is also possible to define the transfer direction A1 as a sternum direction on a line connecting the center of the carpal bone and the center of the sternum to each other after recognizing positions and shapes of the hand H1 and the trunk of the transfer target person. Alternatively, it is also possible to define the transfer direction A1 as a humeral head direction on a line connecting the center of the carpal bone and the center of the humeral head to each other after recognizing positions and shapes of the hand H1 and the trunk of the transfer target person. However, the definition of the transfer direction A1 is not limited to the above, and can be variously modified.

In addition, the release operation according to the present embodiment can include grip force control of the hand portion 443, operation control (hereinafter, referred to as arm operation control) of the arm portion in the manipulator 44, whole body operation control of the autonomous robot 1, and the like. The grip force control of the hand portion 443, the arm operation control of the arm portion in the manipulator 44, the whole body operation control of the autonomous robot 1, and the like, are blended with one another in a certain blend ratio, but in the present embodiment, an evaluation function for evaluating the blend ratio is defined, and in order to obtain an optical solution of the evaluation function, the machine learning described above using the change rate of the grip force applied to the hand portion 443, the information detected by various sensors mounted on the hand portion 443, or the like, as the input and using the continuity of the moving speed of the object B1 in the transfer direction A1 as the output is utilized.

Note that in the present description, the grip force control may be to control a change amount in the force in a unit time when the grip force generated in the hand portion 443 in order to grip the object B1 is decreased for the release.

In addition, the arm operation control may be to change a posture of the arm portion gripping the object B1 and arranging the object B1 in a target coordinate space to move a position of the object B1 in the transfer direction A1 or may be to control a change amount per unit time at that time. By such arm operation control, it becomes possible to decrease an inertial force in the transfer direction A1 generated in the object B1 when the object B1 has been immediately released from the hand portion 443 at a point in time when the start of the release operation has been detected.

Further, the whole body operation control of the robot may be to change a position and a posture of the autonomous robot 1 gripping the object B1 and arranging the object B1 in a target coordinate space to move a position of the object B1 in the transfer direction A1 or may be to control a change amount in the position per unit time at that time.

1.3 Schematic Configuration of Autonomous Robot

Figure 4:
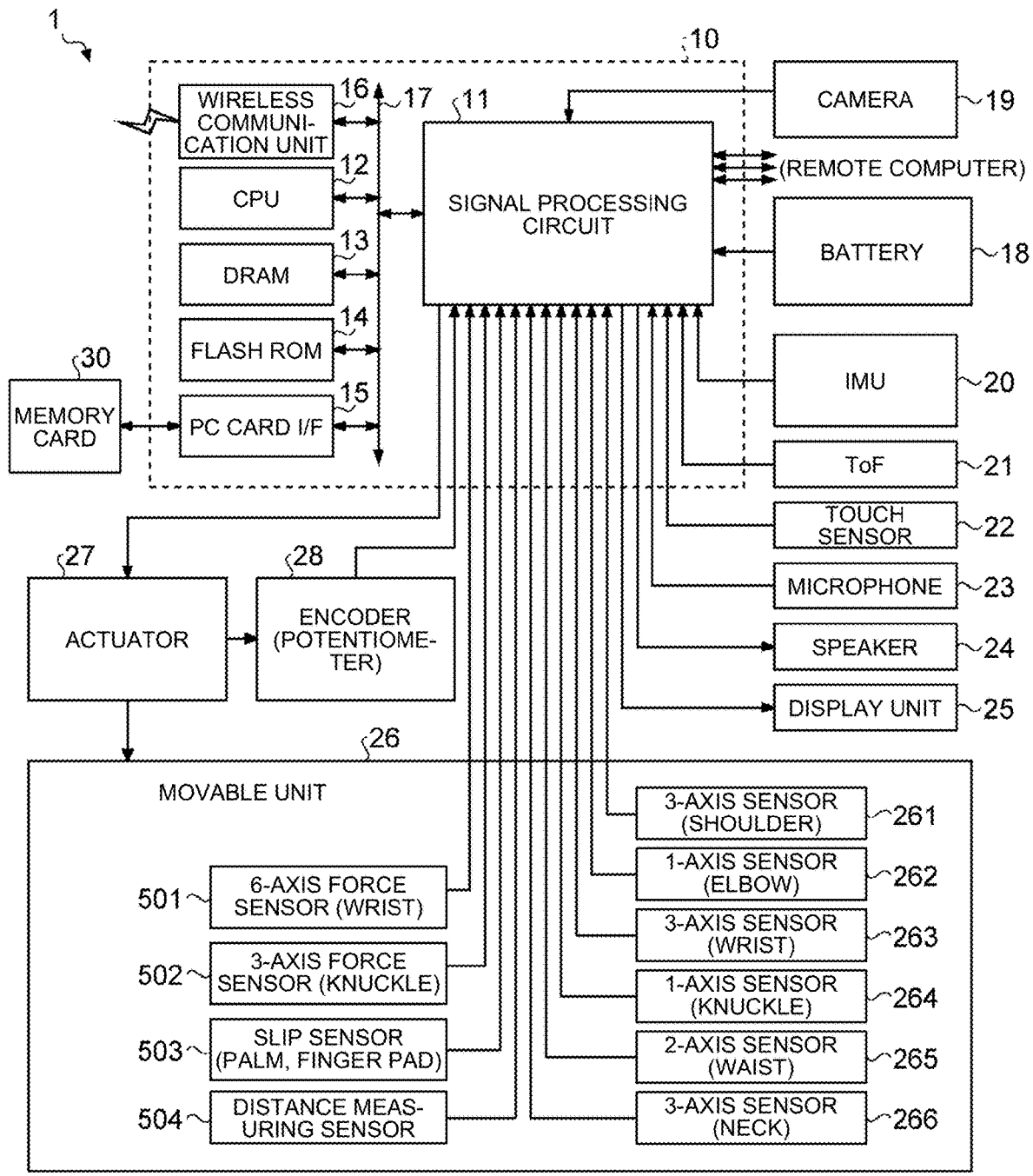
FIG. 4 is a block diagram illustrating a schematic configuration example of the autonomous robot according to the embodiment.

Next, a schematic configuration of the autonomous robot 1 according to the present embodiment will be described in detail with reference to the drawings. FIG. 4 is a block diagram illustrating a schematic configuration example of the autonomous robot according to the present embodiment. As illustrated in FIG. 4, the autonomous robot 1 includes, for example, a control unit 10 formed by connecting a central processing unit (CPU) 12, a dynamic random access memory (DRAM) 13, a flash read only memory (ROM) 14, a personal computer (PC) card interface (I/F) 15, a wireless communication unit 16, and a signal processing circuit 11 to each other via an internal bus 17, and a battery 18 as a power source for the autonomous robot 1.

In addition, the autonomous robot 1 includes a movable unit 26 such as a joint part of the manipulator 44, a joint part ((a neck joint, a waist joint, or the like) of the body portion 42, a wheel, a caterpillar, or the like, and an actuator 27 for driving the movable unit 26, as a movable mechanism for realizing an operation such as a movement, a gesture, or the like.

Further, the autonomous robot 1 includes an inertial measurement unit (IMU) 20 for detecting a direction or an acceleration of movement of the autonomous robot 1 and an encoder (or a potentiometer) 28 detecting a driving amount of the actuator 27, as a sensor (hereinafter, referred to as an internal sensor) for acquiring information such as a moving distance, a moving speed, a moving direction, a posture, or the like. Note that in addition to the IMU 10 and the encoder 28, an acceleration sensor, an angular velocity sensor, or the like can be used as the internal sensor.

Furthermore, the autonomous robot 1 includes a camera 19 that captures an image of an external situation and a time of flight (ToF) sensor 21 that measures a distance to an object existing in a specific direction with respect to the autonomous robot 1, as a sensor (hereinafter referred to as an external sensor) that acquires information such as a terrain around the autonomous robot 1, a distance to or a direction of an object existing around the autonomous robot 1, or the like. Note that in addition to the camera 19 and the ToF sensor 21, a light detection and ranging or laser imaging detection and ranging (LIDAR) sensor, a global positioning system (GPS) sensor, a magnetic sensor, a radio wave intensity measuring unit (hereinafter, referred to as a radio wave intensity sensor) in the wireless communication unit 16 such as Bluetooth (registered trademark) or Wi-Fi (registered trademark), or the like, can be used as the external sensor.

Furthermore, the autonomous robot 1 may be provided with a touch sensor 22 for detecting a physical pressure received from the outside, a microphone 23 for collecting external sound, a speaker 24 for outputting a voice or the like to the surrounding, a display unit 25 for displaying various information to a user or the like, or the like.

Furthermore, the movable unit 26 of the autonomous robot 1 includes a 6-axis force sensor 501, a 3-axis force sensor 502, a slip sensor 503, a distance measuring sensor 504, a 3-axis sensor 261, a 1-axis sensor 262, a 3-axis sensor 263, a 1-axis sensor 264, a 2-axis sensor 265, and a 3-axis sensor 266, as sensors for controlling the transfer of the object B1.

The 6-axis force sensor 501 is attached to, for example, a wrist part of the manipulator 44, and detects a magnitude and a direction of a force and a torque applied to the wrist part.

The 3-axis force sensor 502 is attached to, for example, each knuckle in the hand portion 443 and detects a magnitude and a direction of a force or a torque applied to the knuckle.

The slip sensor 503 is attached to, for example, a part of the hand portion 443 in contact with the object B1 to be gripped, such as the palm, the finger pad, or the like, and detects a magnitude (slip amount) and a direction of shear slip between the object B1 and the part in contact with the object B1. In addition, the slip sensor 503 may detect a magnitude (initial slip amount) and a direction of initial slip generated between the object B1 and the part in contact with the object B1. As the slip sensor 503, for example, a vision sensor that observes deformation of a viscoelastic body attached to the part of the hand portion 443 in contact with the object B1 and having a predetermined shape, a pressure distribution sensor that measures a two-dimensional distribution of a pressure, or the like, can be used.

The distance measuring sensor 504 is attached to, for example, a spot where the object B1 gripped by the hand portion 443 can be observed, such as the wrist, the palm, the back of the hand, the fingertip, or the like, in the manipulator 44, and measures a distance between the hand portion 443 and the object B1.

The 3-axis sensor 261 is attached to a shoulder part, for example, and detects a roll angle, a pitch angle, and a yaw angle of the upper arm portion 441 with respect to the body portion 42.

The 1-axis sensor 262 is attached to, for example, an elbow part, and detects a pitch angle of the forearm portion 442 with respect to the upper arm portion 441.

The 3-axis sensor 263 is attached to, for example, a wrist part, and detects a roll angle, a pitch angle, and a yaw angle of the hand portion 443 with respect to the forearm portion 442.

The 1-axis sensor 264 is attached to, for example, each knuckle of the hand portion 443, and detects a pitch angle of each joint.

The 2-axis sensor 265 is attached to, for example, a joint part between the carriage portion 43 and the body portion 42, and detects a roll angle and a pitch angle of the body portion 42 with respect to the carriage portion 43.

The 3-axis sensor 266 is attached to, for example, a neck part, and detects a roll angle, a pitch angle, and a yaw angle of the head portion 41 with respect to the body portion 42.

In the configuration as described above, various sensors such as the IMU 20, the touch sensor 22, the ToF sensor 21, the microphone 23, the speaker 24, the encoder (or the potentiometer) 28, and the like, the display unit 25, the actuator 27, the camera 19, and the battery 18 are connected to the signal processing circuit 11 of the control unit 10.

The signal processing circuit 14 sequentially fetches sensor data or image data and voice data supplied from the various sensors described above, and sequentially stores these data at predetermined positions in the DRAM 13 via the internal bus 17. In addition, the signal processing circuit 11 sequentially fetches battery residual amount data representing a battery residual amount supplied from the battery 18 together with this, and stores the battery residual amount data at a predetermined position in the DRAM 13.

Each sensor data, image data, voice data, and battery residual amount data stored in the DRAM 13 in such a manner are used when the CPU 12 performs operation control of the autonomous robot 1, and are transmitted to an external server or the like via the wireless communication unit 16 if necessary. Note that the wireless communication unit 16 may be a communication unit for performing communication with an external server or the like via a predetermined network such as a wireless local area network (LAN), a mobile communication network, or the like, in addition to Bluetooth (registered trademark), Wi-Fi (registered trademark), or the like.

The CPU 12 reads a control program stored in a memory card 30 loaded in a PC card slot (not illustrated) or the flash ROM 14 via the PC card I/F 15 or directly, and stores the control program in the DRAM 13, for example, at an initial stage when power is supplied to the autonomous robot 1.

In addition, the CPU 12 determines situations of the autonomous robot 1 and its surrounding, whether or not there is an instruction or an action from the user, or the like, based on each sensor data, image data, voice data, and battery residual amount data sequentially stored in the DRAM 13 from the signal processing circuit 11 as described above.

Further, the CPU 12 may execute self-position estimation or various operations using map data stored in the DRAM 13 or the like or map data acquired from an external server or the like via the wireless communication unit 16 and various information.

Then, the CPU 12 determines the subsequent action based on the determination result described above, the estimated self-position, the control program stored in the DRAM 13, or the like, and executes various actions such as a movement, a gesture, or the like, in addition to the transfer operation of the object B1, by driving the necessary actuator 27 based on a determination result of the subsequent action.

At that time, the CPU 12 generates voice data, if necessary, and supplies the voice data to the speaker 24 as a voice signal via the signal processing circuit 11 to output a voice based on the voice signal to the outside or causes the display unit 25 to display various information.

In such a manner, the autonomous robot 1 is configured to be able to act autonomously according to the situations of the autonomous robot 1 and its surrounding, the instruction and the action from the user.

1.4 Configuration of Hand Portion

Figure 5:
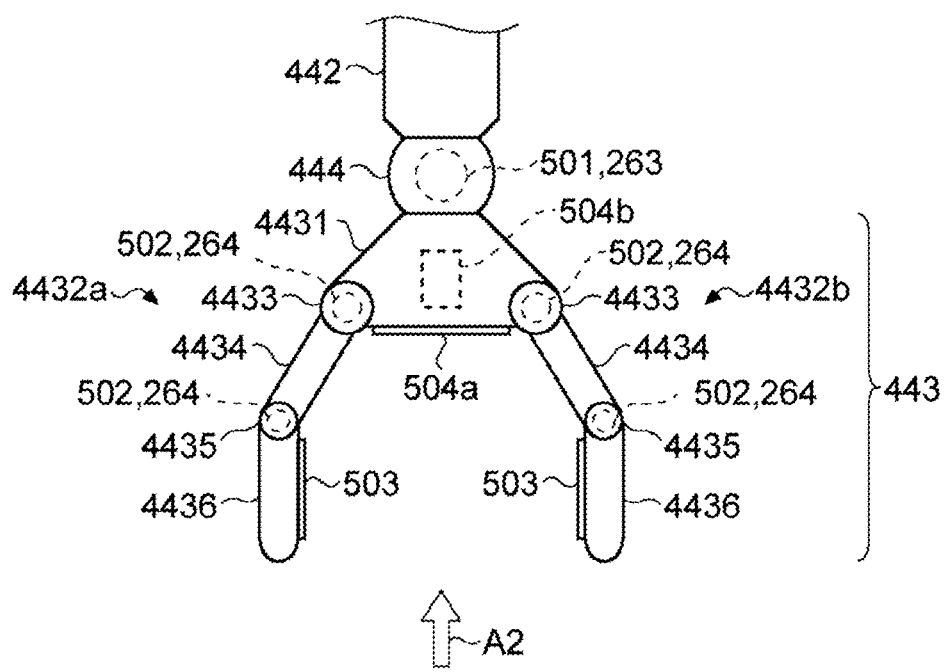
FIG. 5 is an appearance diagram illustrating a configuration example of a hand portion according to the embodiment.

Next, a configuration of the hand portion 443 of the autonomous robot 1 according to the present embodiment will be described in detail with reference to the drawings. Note that in the present description, for the sake of simplicity, a case where the hand portion 443 has two fingers is exemplified. FIG. 5 is an appearance diagram illustrating a configuration example of the hand portion according to the present embodiment. In addition, FIG. 6 is an appearance diagram illustrating a configuration example of a case where the hand portion is viewed from direction A2 of FIG. 5.

Figure 6:
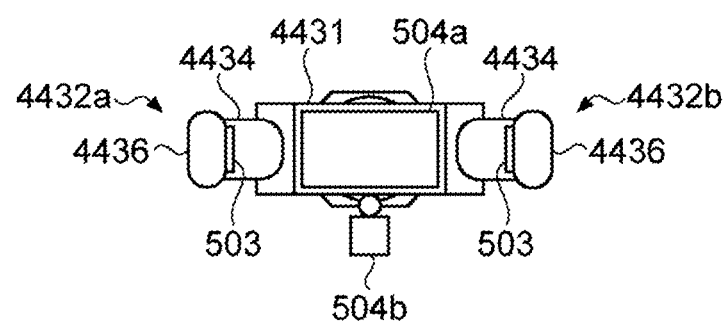
FIG. 6 is an appearance diagram illustrating a configuration example of a case where the hand portion is viewed from direction A2 of FIG. 5.

As illustrated in FIGS. 5 and 6, the hand portion 443 includes, for example, a base portion 4431 corresponding to the palm and the back of the hand, and two finger portions 4432a and 4432b (hereinafter, their reference numerals are 4432 in a case where the finger portions 4432a and 4432b are not distinguished from each other). The base portion 4431 is attached to the forearm portion 442 via, for example, a joint mechanism 444 corresponding to the wrist.

The joint mechanism 444 corresponding to the wrist is provided with the 6-axis force sensor 501 that detects the magnitude and the direction of the force and the torque applied to the wrist part and the 3-axis sensor 263 that detects the roll angle, the pitch angle, and the yaw angle of the hand portion 443 with respect to the forearm portion 442, as described above.

Each finger portion 4432 includes a base joint portion 4434 attached to the base portion 4431 via a joint mechanism 4433 corresponding to a knuckle (third joint) and a distal joint portion 4436 attached to the base joint portion 4434 via a joint mechanism 4435 corresponding to a knuckle (first joint). These two finger portions 4432a and 4432 are attached to the base portion 4431 so that surfaces thereof corresponding to the finger pads face each other, for example.

The joint mechanisms 4433 and 4435 corresponding to each knuckle of each finger portion 4432 are provided with the 3-axis force sensor 502 that detects the magnitude and the direction of the force or the torque applied to each knuckle and the 1-axis sensor 264 that detects the pitch angle of each joint, as described above.

In addition, a part of the finger portion 4432 in contact with the object B1 at the time of gripping the object B1, for example, a part of the distal joint portion 4436 corresponding to the finger pad is provided with the slip sensor 503. Further, a surface of the base portion 4431 corresponding to the palm, that is, a surface facing the slip sensor 503 attached to the distal joint portion 4436 when the finger portion 4432 is folded is provided with a ToF sensor 504a as the distance measuring sensor 504. Furthermore, a part of the base portion 4431 corresponding to the back of the hand is provided with a camera 504b as the distance measuring sensor 504 capable of adjusting its roll angle, pitch angle, and yaw angle.

1.5 Functional Components of Autonomous Robot

Figure 7:
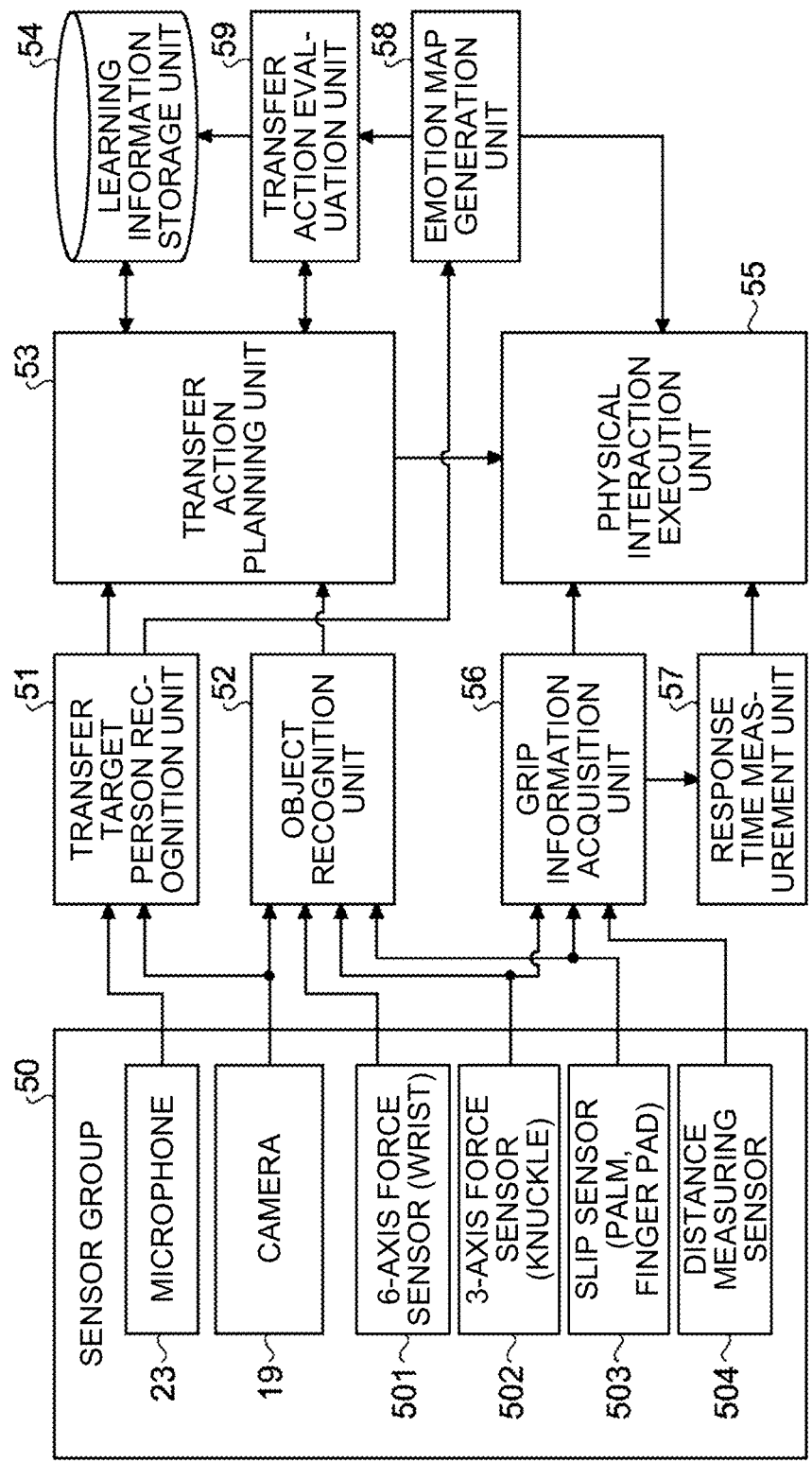
FIG. 7 is a block diagram illustrating an example of functional components for executing a transfer operation of the autonomous robot according to the embodiment.

Next, functional components for executing a transfer operation of the autonomous robot 1 according to the present embodiment will be described in detail with reference to the drawings. FIG. 7 is a block diagram illustrating an example of functional components for executing a transfer operation of the autonomous robot according to the present embodiment. Note that components other than a physical interaction execution unit 55 and a learning information storage unit 54 of the functional components illustrated in FIG. 7 can be realized by executing a predetermined program stored in the flash ROM 14 or the memory card or a program downloaded via the wireless communication unit 16 by, for example, the CPU 12 illustrated in FIG. 4. In addition, the physical interaction execution unit 55 can be realized by, for example, the CPU 12, the signal processing circuit 11, the movable unit 26, and the actuator 27 illustrated in FIG. 4. Further, the learning information storage unit 54 can be realized by, for example, the flash ROM 14 or the memory card 30 illustrated in FIG. 4.

As illustrated in FIG. 7, the autonomous robot 1 includes a transfer target person recognition unit 51, an object recognition unit 52, a transfer action planning unit 53, the learning information storage unit 54, the physical interaction execution unit 55, a grip information acquisition unit 56, a response time measurement unit 57, an emotion map generation unit 58, and a transfer action evaluation unit 59, as functional components for executing the transfer operation of the object B1 with the transfer target person. In addition, for example, the camera 19, the microphone 23, the 6-axis force sensor 501, the 3-axis force sensor 502, the slip sensor 503, and the distance measuring sensor 504 of the sensors included in the autonomous robot 1 constitute a sensor group 50 for acquiring various information used in execution of the transfer operation.

The transfer target person recognition unit 51 recognizes the existence of the transfer target person and/or the hand H1 of the transfer target person, an intention of the transfer target person to receive the object B1, or the behavior, the situation, or the like (hereinafter, referred to as a posture of the transfer target person) of the transfer target person by analyzing, for example, image data acquired by the camera 19 or voice data input from the microphone 23, and inputs a recognition result to the transfer action planning unit 53. In addition, the transfer target person recognition unit 51 detects a change in an emotion of the transfer target person in a process of a release operation executed by a physical interaction execution unit 55 as be described later, for example, a change in an emotion such as interrupting or abandoning the receiving operation due to hotness, coldness, timing mismatch, or the like, by analyzing the image data acquired by the camera 19 or the voice data input from the microphone 23 in the process of the release operation, and inputs a detection result to the emotion map generation unit 58.

The object recognition unit 52 recognizes or estimates a position of the object B1 or characteristics of the object B1, for example, a coefficient of static friction, a coefficient of dynamic friction, a mass, a shape dimension, a rigidity, a strength, a temperature, a humidity, and the like, based on, for example, an analysis result of the image data acquired by the camera 19, sensor data input from the 6-axis force sensor 501, the 3-axis force sensor 502, and the slip sensor 503, or the like, and inputs a recognition or estimation result to the transfer action planning unit 53.

The learning information storage unit 54 stores, for example, a learned model constructed by machine-learning a transfer operation performed in the past, a transfer action plan planned by the transfer action planning unit 53 and an evaluation result thereof, or the like. Note that a component that constructs the learned model by machine-learning the transfer operation performed in the past may be arranged in the autonomous robot 1, for example, or may be arranged on a server connected to the autonomous robot 1 via a predetermined network.

The transfer action planning unit 53 creates a transfer action plan for transferring the object B1 to the transfer target person based on the learned model stored in the learning information storage unit 54, the transfer action plan planned in the past and the evaluation result thereof, or the like, from the recognition result of the transfer target person input from the transfer target person recognition unit 51 and the recognition or estimation result of the object B1 input from the object recognition unit 52. The created transfer action plan can include, for example, an operation of lifting the object B1 from a table, a floor, or the like, or receiving the object B1 from a person or the like, and an operation of transferring the object B1 to the transfer target person.

The physical interaction execution unit 55 executes a physical interaction (transfer action) that transfers the object B1 to the transfer target person by executing the transfer action plan created by the transfer action planning unit 53.

The grip information acquisition unit 56 detects a timing when the transfer target person has started the receiving operation from, for example, a component in a direction opposite to gravity, a direction opposite to a rotational moment due to the gravity, or a position direction of the hand H1 of the transfer target person in a slip amount or an initial slip amount detected by the slip sensor 503 or a slip amount detected by the distance measuring sensor 504 in order to determine a start timing of the release operation by the physical interaction execution unit 55, and inputs the detected timing to the physical interaction execution unit 55.

In addition, the grip information acquisition unit 56 continuously inputs the slip amount of the object B1 in the transfer direction A1 detected by the slip sensor 503 and/or the distance measuring sensor 504 to the physical interaction execution unit 55 during, for example, a period in which the physical interaction execution unit 55 is executing the release operation in order to ensure continuity of a moving speed of the object B1 in the transfer direction A1 during the period in which the physical interaction execution unit 55 is executing the release operation.

Further, the grip information acquisition unit 56 continuously inputs a slip amount of the object B1 in the gravity direction detected by the slip sensor 503 and/or the distance measuring sensor 504 to the physical interaction execution unit 55 during, for example, the period in which the physical interaction execution unit 55 is executing the release operation in order to reduce a fall or an unnatural vertical movement of the object B1 during the period in which the physical interaction execution unit 55 is executing the release operation.

Furthermore, the grip information acquisition unit 56 inputs, for example, information detected by various sensors provided on the hand portion 443 during the period in which the physical interaction execution unit 55 is executing the release operation, for example, information such as a grip force detected by the 3-axis force sensor 502, the slip amount and/or the initial slip amount detected by the slip sensor 503, or the like, to a machine learning unit (not illustrated) as an input in machine learning of the transfer operation. In addition, the grip information acquisition unit 56 inputs, for example, the distance to the object B1 detected by the distance measuring sensor 504 during the period in which the physical interaction execution unit 55 is executing the release operation to the machine learning unit (not illustrated) as an output in the machine learning of the transfer operation.

The response time measurement unit 57 measures, for example, a time (response time) from when the autonomous robot 1 starts the release operation to decrease the grip force of the hand portion 443 until the moving speed of the object B1 in the transfer direction A1 increases, and inputs the measured response time to the physical interaction execution unit 55.

The emotion map generation unit 58 generates an emotion map in which the change in the emotion of the transfer target person along a time axis during the execution of the release operation is mapped, based on, for example, information regarding the change in the emotion of the transfer target person input from the transfer target person recognition unit 51 during the period in which the physical interaction execution unit 55 is executing the release operation, and inputs the generated emotion map to the transfer action evaluation unit 59. Note that the mapped emotion may include, for example, not only a negative emotion such as hotness, coldness, timing mismatch, or the like, but also a positive emotion such as an emotion indicating that the transfer target person could comfortably receive the object, or the like.

The transfer action evaluation unit 59 evaluates the transfer action plan planned by the transfer action planning unit 53 based on the emotion map input from the emotion map generation unit 58, and inputs an evaluation result together with the transfer action plan into the learning information storage unit 54.

1.6 With Respect to Machine Learning of Transfer Action

Figure 8:
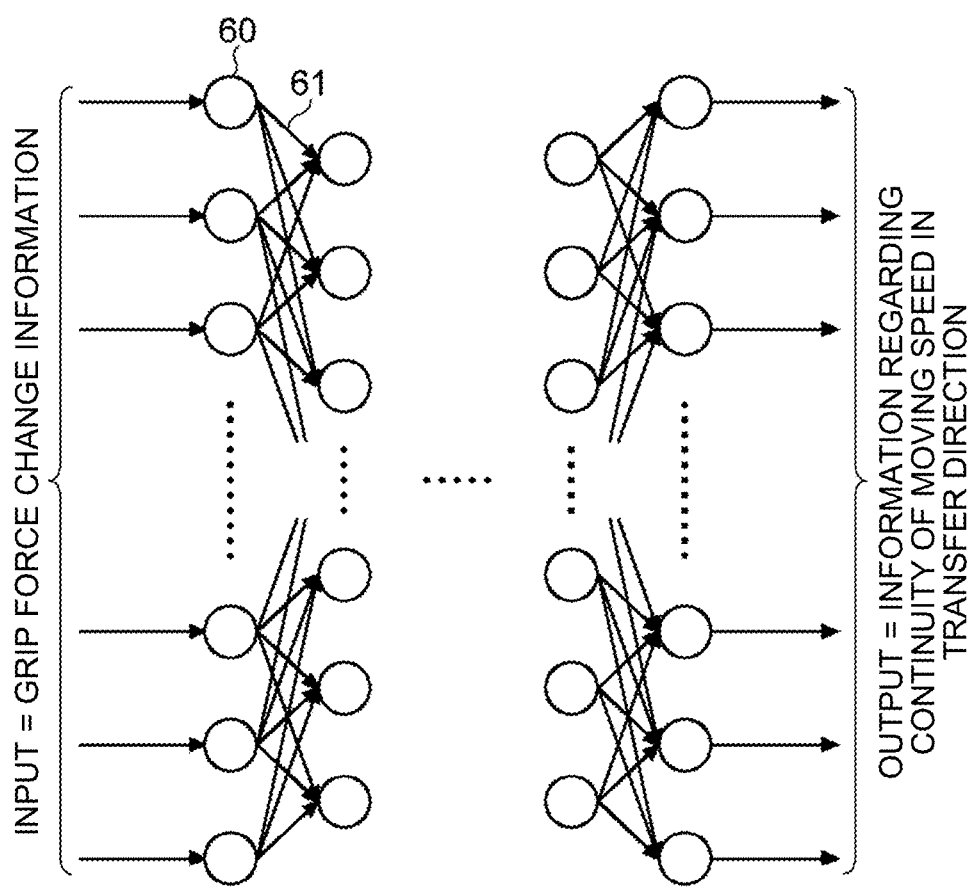
FIG. 8 is a schematic diagram illustrating an example of input/output information in a machine learning process according to the embodiment.

Here, machine learning of the transfer action will be described. FIG. 8 is a schematic diagram illustrating an example of input/output information in a machine learning process. As illustrated in FIG. 8, in the machine learning process of the transfer action in the present embodiment, information detected by various sensors provided on the hand portion 443 or information obtained from these information, for example, information such as the grip force detected by the 3-axis force sensor 502 or a change rate in the grip force, the slip amount and/or the initial slip amount detected by the slip sensor 503 or a change rate in the slip amount and/or the initial slip amount, or the like, is given to an input layer, information regarding the continuity of the moving speed of the object B1 in the transfer direction A1 is given to an output layer, and a weight of each edge 61 connecting nodes (also referred to as neurons) 60 of each layer from the input layer to the output layer via a hidden layer to each other is obtained. Therefore, a learned model optimal for the transfer operation is created. Note that it is also possible to use the emotion of the transfer target person for input or output of the machine learning, as described above.

Note that in the machine learning, for example, as the continuity of the moving speed of the object B1 in the transfer direction A1 becomes higher, a positive reward is set. On the other hand, as the continuity of the moving speed of the object B1 in the transfer direction A1 becomes lower, that is, as a movement amount of the object B1 in the transfer direction A1 per unit time becomes more discontinuous, a negative reward is set.

In addition, in the machine learning, the reward may be set based on the emotion and/or the change in the emotion of the transfer target person during the period in which the physical interaction execution unit 55 is executing the release operation. For example, in a case where a negative emotion is recognized from the transfer target person during the period in which the physical interaction execution unit 55 is executing the release operation, a negative reward may be set, and in a case where a positive emotion is recognized from the transfer target person during the period in which the physical interaction execution unit 55 is executing the release operation, a positive reward may be set. Whether an emotion of the transfer target person is a negative emotion or a positive emotion can be determined based on, for example, the emotion map generated by the emotion map generation unit 58.

1.7 Operation Example

Figure 9:
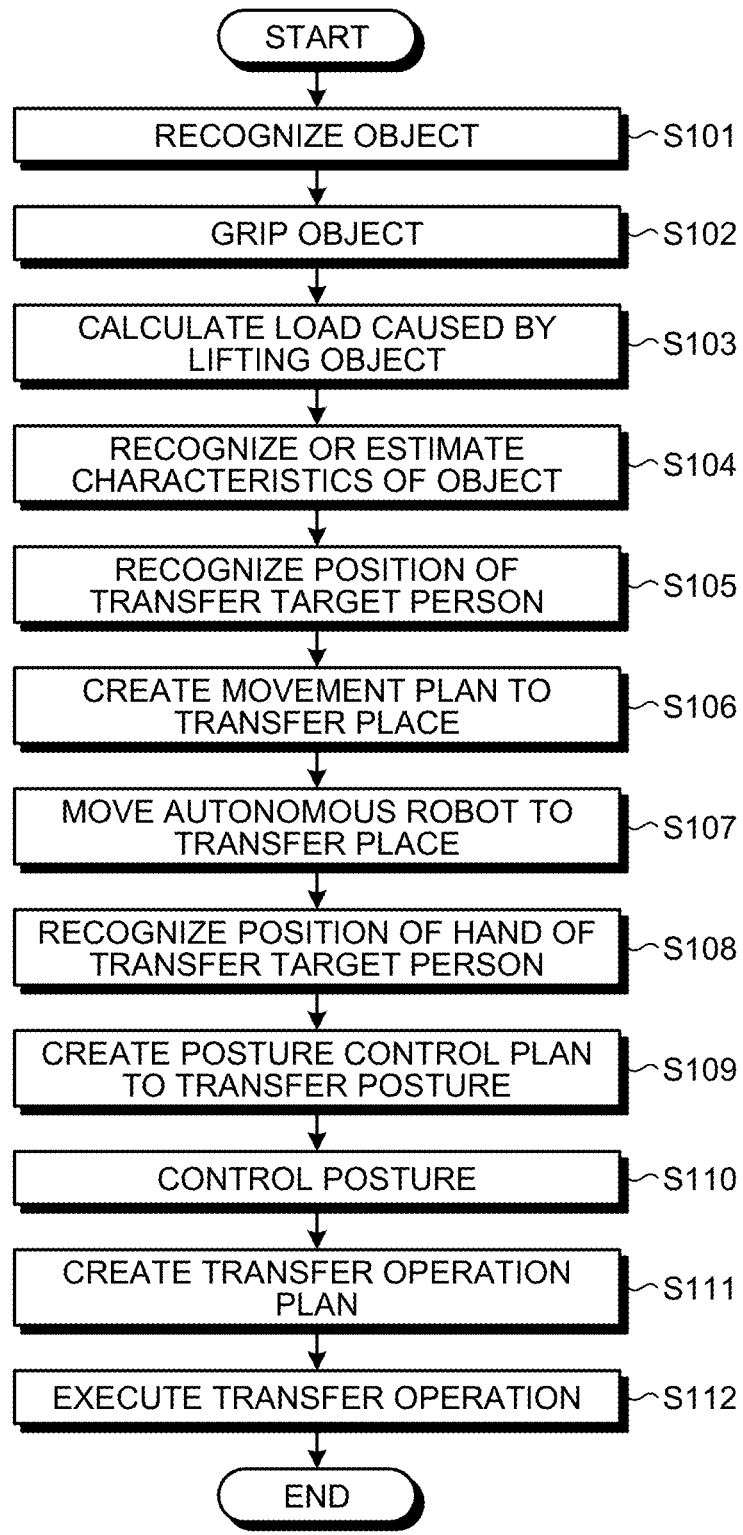
FIG. 9 is a flowchart illustrating a schematic operation example according to the embodiment.

Next, an operation example of the autonomous robot 1 according to the present embodiment will be described in detail with reference to the drawings. FIG. 9 is a flowchart illustrating a schematic operation example according to the present embodiment. As illustrated in FIG. 9, in the present operation, first, the object recognition unit 52 recognizes, for example, a position, a shape dimension, or the like, of the object B1 which is a target to be transferred by analyzing the image data acquired by the camera 19 (Step S101). Subsequently, the physical interaction execution unit 55 grips the object B1 based on the position, the shape dimension, or the like, of the object B1 recognized by the object recognition unit 52 (Step S102).

Next, when the physical interaction execution unit 55 lifts the object B1, the object recognition unit 52 calculates a load caused by lifting the object B1 based on the sensor data detected by the various sensors (the 6-axis force sensor 501, the 3-axis force sensor 502, the slip sensor 503, and the like) of the manipulator 44 (Step S103), and recognizes or estimates the characteristics of the object B1, for example, the coefficient of static friction, the coefficient of dynamic friction, the mass, the rigidity, the strength, the temperature, the humidity, and the like, based on the calculated load (Step S104).

Next, the transfer target person recognition unit 51 recognizes a position of the transfer target person by analyzing, for example, the image data acquired by the camera 19 or the voice data input from the microphone 23 (Step S105). Subsequently, the transfer action planning unit 53 creates a movement plan from the position of the transfer target person recognized by the transfer target person recognition unit 51 to a determined transfer place of the object B1 (Step S106). Then, the physical interaction execution unit 55 moves the autonomous robot 1 to the transfer place according to the movement plan created by the transfer action planning unit 53 (Step S107).

Next, the transfer target person recognition unit 51 recognizes a position of the hand H1 of the transfer target person by analyzing, for example, the image data acquired by the camera 19 (Step S108). Subsequently, the transfer action planning unit 53 creates a posture control plan from the position of the hand H1 of the transfer target person recognized by the transfer target person recognition unit 51 to a determined posture of the transfer of the autonomous robot 1 (Step S109). Then, the physical interaction execution unit 55 controls a posture of the autonomous robot 1 according to the posture control plan created by the transfer action planning unit 53 (Step S110). Note that the posture control of the autonomous robot 1 can include, for example, profile control of the manipulator 44, tilt control of the body portion 42 and the head portion 41, or the like. In addition, in Step S108, in addition to the position of the hand H1 of the transfer target person, a behavior, a situation, or the like of the hand H1 of the transfer target person can be recognized.

Next, the transfer action planning unit 53 creates a transfer operation plan for transferring the object B1 to the transfer target person based on the learned model stored in the learning information storage unit 54, the transfer action plan planned in the past and the evaluation result thereof, or the like, from the characteristics of the object B1 recognized or estimated by the object recognition unit 52 and the position, the behavior, the situation, or the like, of the hand H1 of the transfer target person recognized by the transfer target person recognition unit 51 (Step S111). Subsequently, the physical interaction execution unit 55 executes the transfer action of transferring the object B1 to the transfer target person according to the transfer operation plan created by the transfer action planning unit 53 (Step S112). Thereafter, the present operation ends.

1.8 Specific Example of Transfer Operation

Next, the transfer operation illustrated in Step S112 of FIG. 9 will be described with some examples.

1.8.1 First Example

Figure 10:
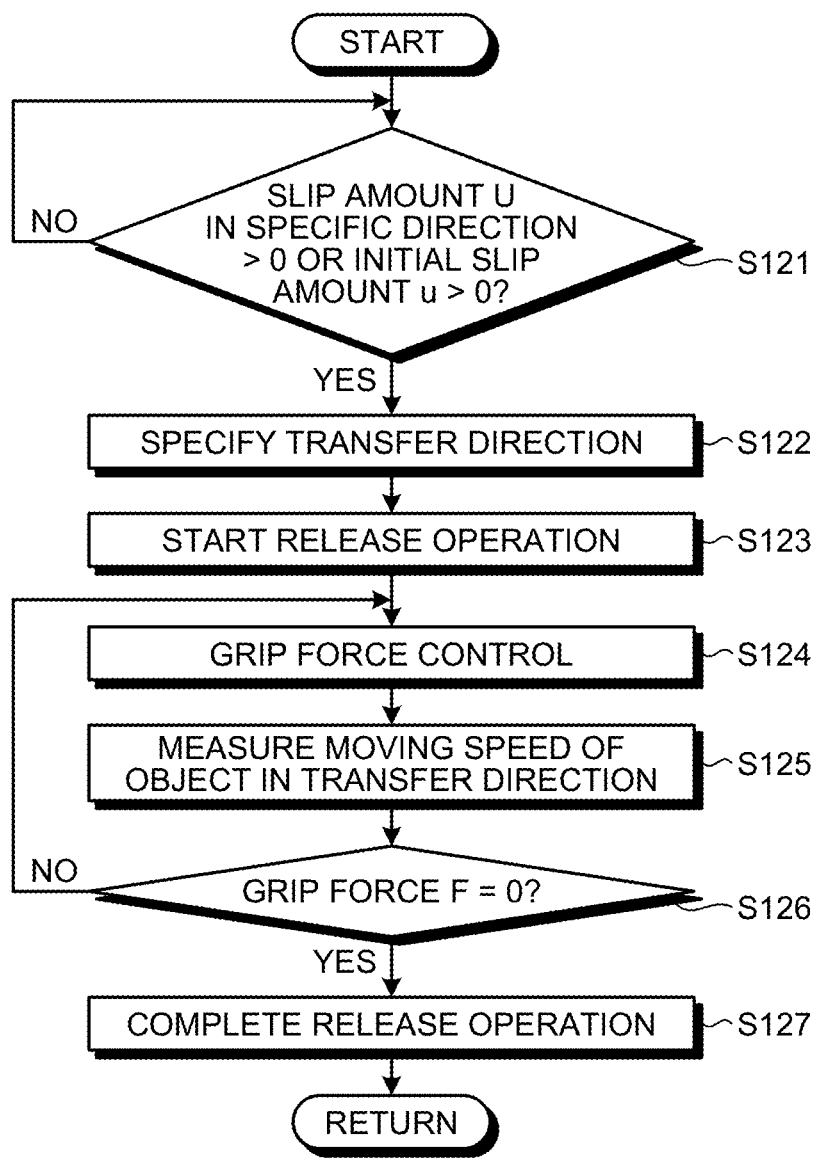
FIG. 10 is a flowchart illustrating a transfer operation according to a first example of the embodiment.

First, a transfer operation according to a first example will be described. FIG. 10 is a flowchart illustrating a transfer operation according to a first example of the present embodiment. Note that in the first example, a case where the physical interaction execution unit 55 executes a release operation only with grip force control is exemplified.

As illustrated in FIG. 10, in the release operation according to the first example, first, the grip information acquisition unit 56 determines whether or not a component in a direction opposite to gravity, a direction opposite to a rotational moment due to the gravity, or a position direction of the hand H1 of the transfer target person (hereinafter, these directions are referred to as a specific direction) in, for example, the slip amount U or the initial slip amount u detected by the slip sensor 503 or the slip amount U detected by the distance measuring sensor 504 has become larger than zero (Step S121). That is, it is determined whether or not the receiving operation by the transfer target person has started. In a case where the slip amount U or the initial slip amount u in the specific direction is zero or less (NO in Step S121), that is, in a case where the receiving operation by the transfer target person has not yet started, the present operation returns to Step S121 and waits for the start of the receiving operation by the transfer target person.

On the other hand, in a case where the slip amount U or the initial slip amount u in the specific direction has becomes larger than zero (YES in Step S121), that is, in a case where the receiving operation by the transfer target person has started, the grip information acquisition unit 56 specifies the transfer direction A1 by analyzing, for example, image data acquired by the camera 504*b* in the distance measuring sensor 504 (Step S122). The specified transfer direction A1 is input from the grip information acquisition unit 56 to the physical interaction execution unit 55 together with a start trigger of the release operation based on the fact that the slip amount U or the initial slip amount u in the specific direction has become larger than zero. In response to this, the physical interaction execution unit 55 starts the release operation of the object B1 in the transfer direction A1 (Step S123).

When the release operation is started in such a manner, the physical interaction execution unit 55 then executes grip force control of the hand portion 443 (Step S124). Specifically, the physical interaction execution unit 55 controls a change amount in a force in a unit time when a grip force F generated in the hand portion 443 in order to grip the object B1 is decreased for the release.

In addition, after the physical interaction execution unit 55 starts the release operation, the grip information acquisition unit 56 measures a moving speed of the object B1 in the transfer direction A1 by continuously measuring a change in a slip amount of the object B1 in the transfer direction A1 (Step S125). The measured moving speed of the object B1 in the transfer direction A1 is input to the physical interaction execution unit 55 and is used for the grip force control in the physical interaction execution unit 55. That is, the physical interaction execution unit 55 controls a decrease amount in the grip force generated in the hand portion 443 per unit time so that the moving speed of the object B1 in the transfer direction A1 maintains continuity (feedback control).

Thereafter, the physical interaction execution unit 55 determines whether or not the grip force F generated in the hand portion 443 has reached zero (Step S126), completes the release operation (Step S127) in a case where the grip force F has reached zero (YES in Step S126), and ends the present transfer operation.

On the other hand, when the grip force F has not reached zero (NO in Step S126), the present operation returns to Step S124, and the subsequent operations are repeatedly executed until the grip force F reaches zero.

As such, by adopting a configuration in which the physical interaction execution unit 55 starts the release operation (Step S123) based on the fact that the component in the specific direction in the slip amount U or the initial slip amount u detected by the slip sensor 503 or the slip amount U detected by the distance measuring sensor 504 has become larger than zero (YES in Step S121), it becomes possible to start the release operation at an initial stage of the transfer operation. Therefore, it becomes possible to suppress a fluctuation in a load applied to the object B1 or the grip force of the hand portion 443 to the minimum, and it becomes thus possible to transfer the object B1 more smoothly.

In addition, by continuously measuring the change in the slip amount of the object B1 in the transfer direction A1 (Step S125) after the physical interaction execution unit 55 starts the release operation and controlling the decrease amount in the grip force F generated in the hand portion 443 in a unit time based on the measured change in the slip amount of the object B1 in the transfer direction A1, it is possible to reduce a sudden change in displacement of the object B1 in the transfer direction A1. Therefore, it becomes possible to transfer the object B1 more smoothly, and it becomes possible to reduce an erroneous fall of the object B1 or unnatural vertical displacement of the object B1 within the hand portion 443.

Note that the physical interaction execution unit 55 may stop or end the release operation, for example, in a case where the moving speed of the object B1 in the transfer direction A1 does not increase for a certain time or more based on the response time measured by the response time measurement unit 57 after the physical interaction execution unit 55 starts the release operation in Step S123.

In addition, a case where the hand portion 443 has the two fingers has been exemplified in the present embodiment, but for example, in a case where the hand portion 443 has three or more fingers, a grip force may be gradually decreased from a finger portion other than two finger portions sandwiching the object B1 therebetween, in the grip force control. Therefore, a risk that the object B1 will fall is reduced, such that it becomes possible to execute the transfer operation more stably.

1.8.2 Second Example

Figure 11:
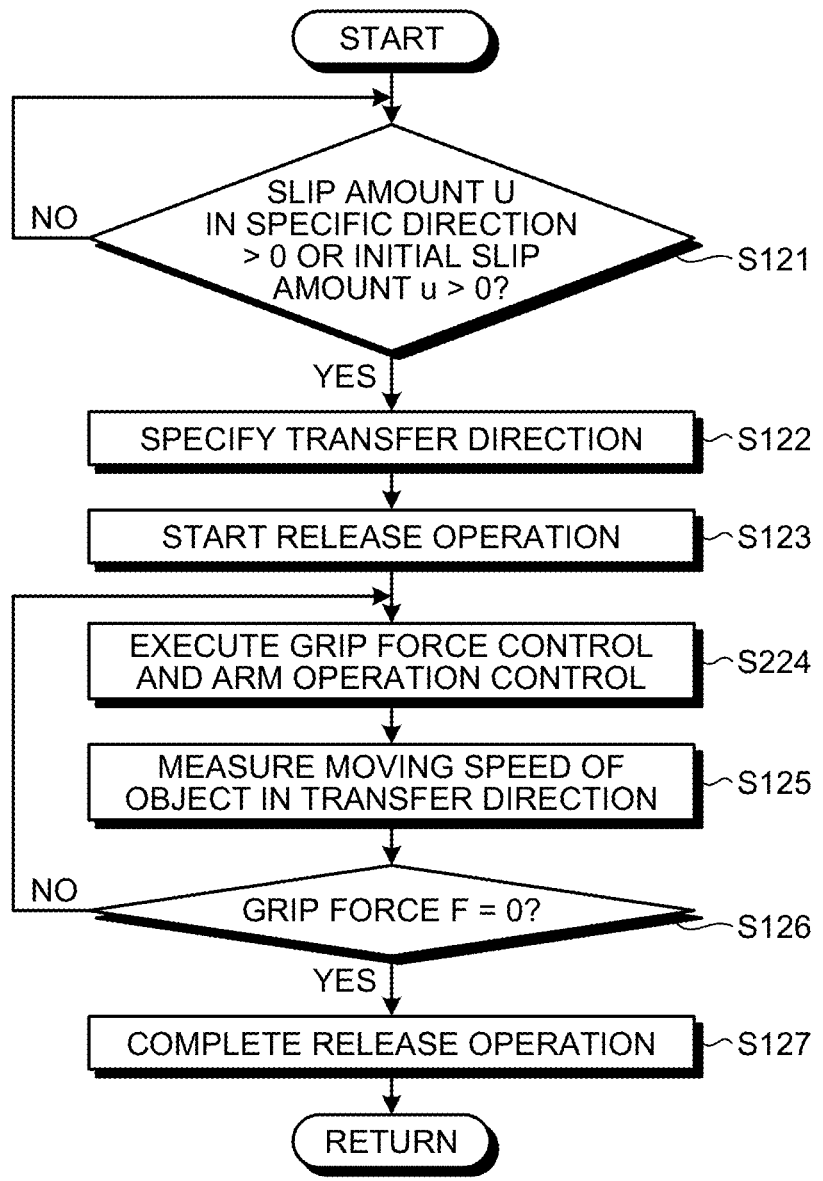
FIG. 11 is a flowchart illustrating a transfer operation according to a second example of the embodiment.

Next, a transfer operation according to a second example will be described. FIG. 11 is a flowchart illustrating a transfer operation according to a second example of the present embodiment. In the second example, a case where the physical interaction execution unit 55 executes a release operation by blending grip force control and arm operation control with each other in a blend ratio specified based on a learned model is exemplified.

As illustrated in FIG. 11, in the transfer operation according to the second example, Step S124 of FIG. 9 is replaced with Step S224 in, for example, a flow similar to that of the transfer operation according to the first example described with reference to FIG. 9.

In Step S224, the physical interaction execution unit 55 executes the grip force control of the hand portion 443 and the arm operation control of the arm portion blended with each other in the blend ratio specified based on the learned model. Specifically, the physical interaction execution unit 55 controls (grip force control) a change amount in a force in a unit time when a grip force F generated in the hand portion 443 in order to grip the object B1 is decreased for the release, and controls a change amount in a position per unit time when a position of the object B1 is moved in the transfer direction A1 by changing a posture of the arm portion gripping the object B1 and arranging the object B1 in a target coordinate space. At that time, a decrease amount in the grip force F per unit time and a change amount in the posture of the arm portion are blended with each other in the above-mentioned blend ratio so that a moving speed of the object B1 in the transfer direction A1 maintains continuity.

1.8.3 Third Example

Figure 12:
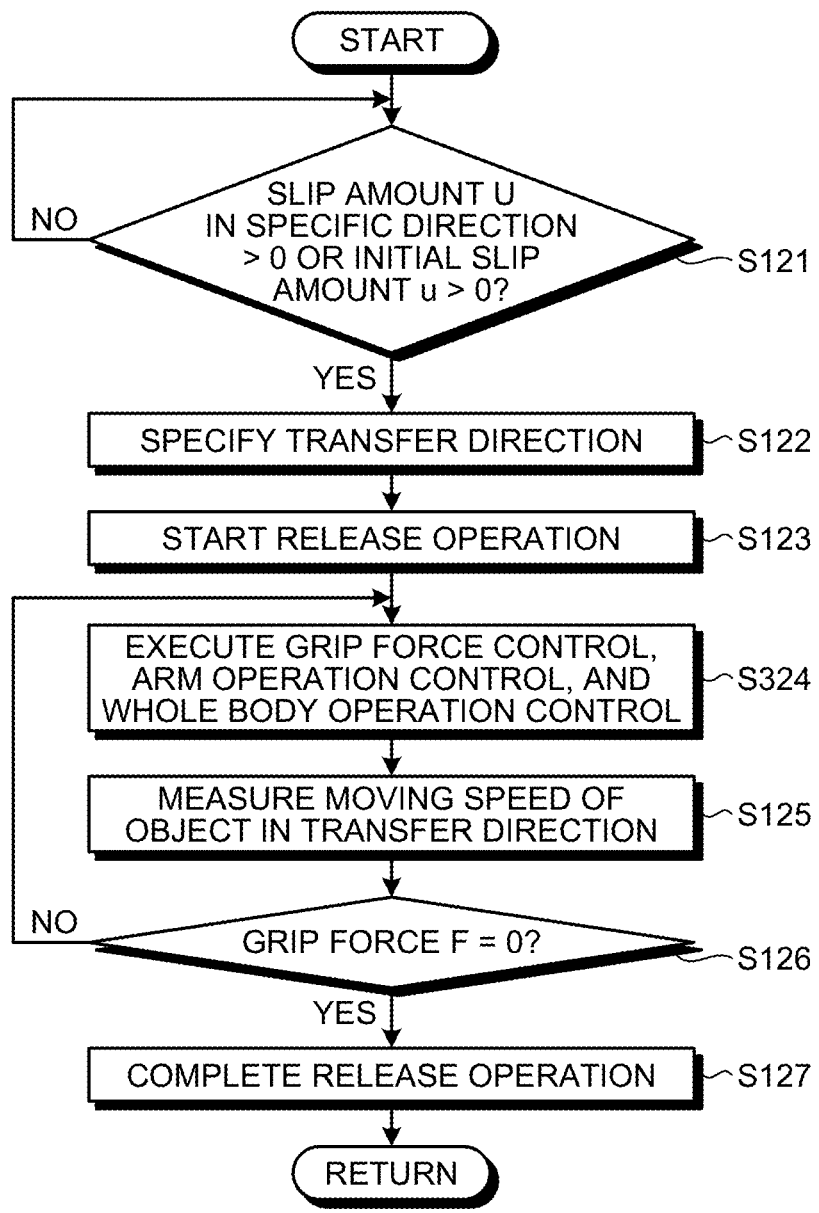
FIG. 12 is a flowchart illustrating a transfer operation according to a third example of the embodiment.

Next, a transfer operation according to a third example will be described. FIG. 12 is a flowchart illustrating a transfer operation according to a third example of the present embodiment. In the third example, a case where the physical interaction execution unit 55 executes a release operation by blending grip force control, arm operation control, and whole body operation control with one another in a blend ratio specified based on a learned model is exemplified.

As illustrated in FIG. 12, in the transfer operation according to the third example, Step S124 of FIG. 9 is replaced with Step S324 in, for example, a flow similar to that of the transfer operation according to the first example described with reference to FIG. 9.

In Step S324, the physical interaction execution unit 55 executes the grip force control of the hand portion 443, the arm operation control of the arm portion, and the whole body operation control of the autonomous robot 1 blended with one another in the blend ratio specified based on the learned model. Specifically, the physical interaction execution unit 55 controls (grip force control) a change amount in a force in a unit time when a grip force F generated in the hand portion 443 in order to grip the object B1 is decreased for the release, controls a change amount in a position per unit time when a position of the object B1 is moved in the transfer direction A1 by changing a posture of the arm portion gripping the object B1 and arranging the object B1 in a target coordinate space, and moves a position of the object B1 in the transfer direction A1 by changing a position and a posture of the autonomous robot 1 gripping the object B1 and arranging the object B1 in the target coordinate space. At that time, a decrease amount in the grip force F per unit time, a change amount in the posture of the arm portion, and a change amount in the position and the posture of the autonomous robot 1 are blended with one another in the above-mentioned blend ratio so that a moving speed of the object B1 in the transfer direction A1 maintains continuity.

1.8.4 Fourth Example

Figure 13:
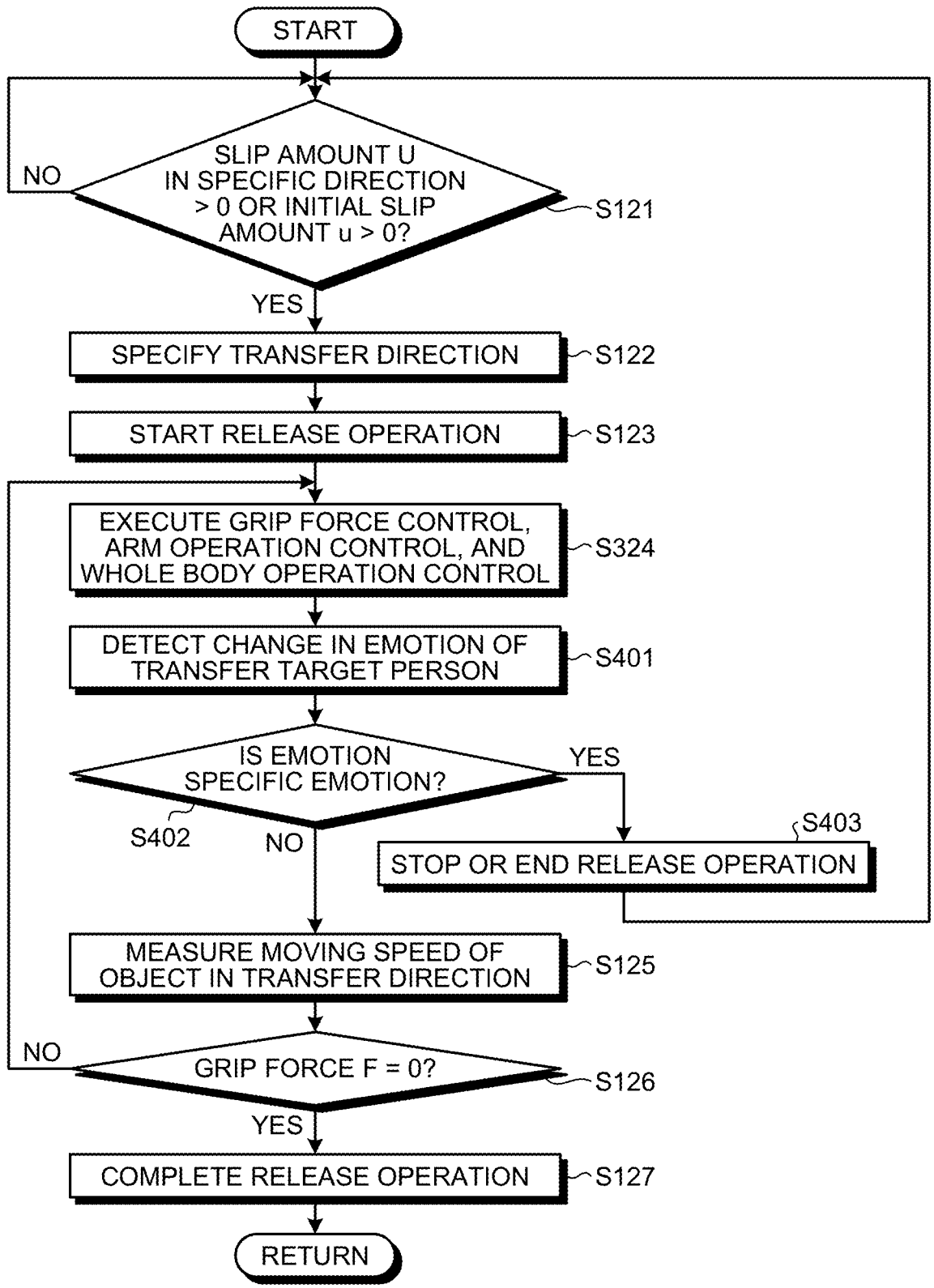
FIG. 13 is a flowchart illustrating a transfer operation according to a fourth example of the embodiment.

Next, a transfer operation according to a fourth example will be described. FIG. 13 is a flowchart illustrating a transfer operation according to a fourth example of the present embodiment. In the fourth example, for example, in addition to the transfer operation illustrated in the third example, a case where the physical interaction execution unit 55 executes stop or end of a release operation according to a change in an emotion of a transfer target person is exemplified. Note that the third example is used as a base in the present description, but the fourth example is not limited thereto, and the first example or the second example can also be used as a base.

As illustrated in FIG. 13, in the transfer operation according to the fourth example, Steps S401 to S403 are added between Step S324 and Step S125 in, for example, a flow similar to that of the transfer operation according to the third example described with reference to FIG. 12.

In Step S401, the transfer target person recognition unit 51 detects a change in an emotion of the transfer target person by analyzing, for example, the image data acquired by the camera 19 or the voice data input from the microphone 23. Information regarding the detected change in the emotion of the transfer target person may be input to the emotion map generation unit 58 as, for example, input or output of machine learning.

Next, in Step S402, the transfer target person recognition unit 51 determines whether or not the detected changed emotion is a specific emotion. The specific emotion may be, for example, a negative emotion that leads to interruption or abandonment of the transfer operation by the transfer target person. In a case where the specific emotion is not detected (NO in Step S402), the present operation proceeds to Step S125. On the other hand, in a case where the specific emotion is detected (YES in Step S402), the physical interaction execution unit 55 stops or ends the release operation (Step S403), and then returns to Step S121. Note that an instruction to stop the release operation may be input directly from the transfer target person recognition unit 51 to the physical interaction execution unit 55 or may be input from the transfer target person recognition unit 51 to the physical interaction execution unit 55 via the emotion map generation unit 58.

As described above, after the physical interaction execution unit 55 starts the release operation in Step S123, the transfer target person recognition unit 51 may detect the change in the emotion of the transfer target person by analyzing the image data from the camera 19 or the voice data from the microphone 23, and may be configured so that the release operation by the physical interaction execution unit 55 is interrupted in a case where the detected emotion is a specific emotion that leads to the interruption or the abandonment of the transfer operation. Therefore, when the transfer target person interrupts or abandons the receiving operation, it becomes possible to cause the physical interaction execution unit 55 to quickly execute the stop or the end of the release operation, and it becomes thus possible to reduce a fall of the object B1, jumping-out of contents, or the like.

1.9 With Respect to Blend Between Grip Operation and Release Operation

Figure 14:
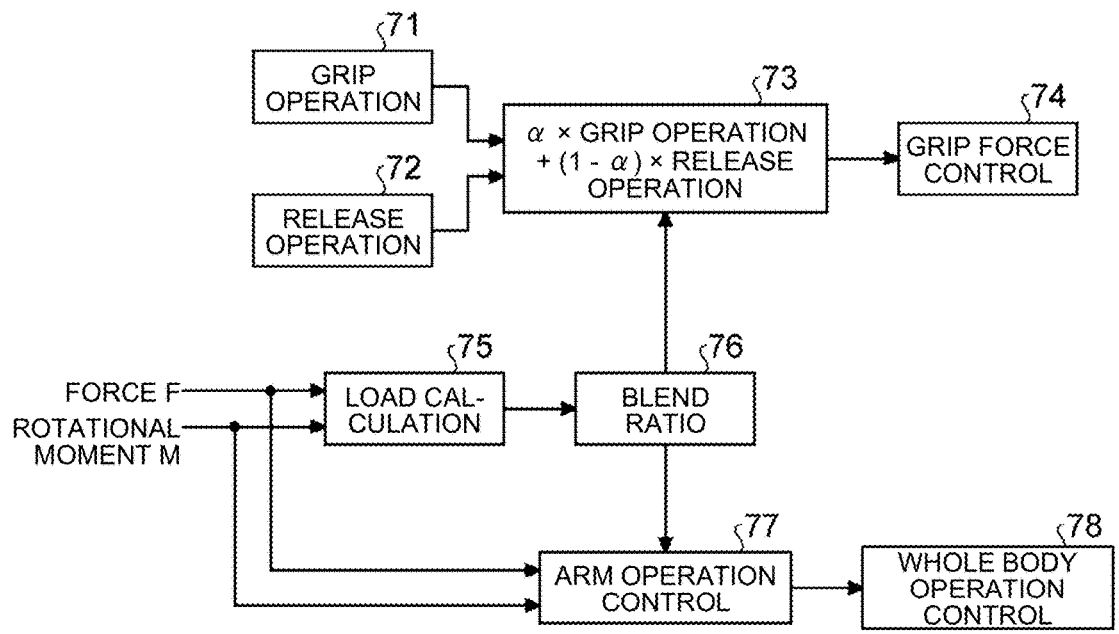
FIG. 14 is a diagram for describing a blend between a grip operation and a release operation according to the embodiment.

Next, a blend between a grip operation and a release operation will be described in detail with reference to the drawings. FIG. 14 is a diagram for describing a blend between a grip operation and a release operation according to the present embodiment. Note that in FIG. 14, a case (third example) where the physical interaction execution unit 55 executes a release operation by blending grip force control, arm operation control, and whole body operation control with one another in a blend ratio specified based on a learned model is exemplified.

As illustrated in FIG. 14, when transferring a gripped object to the transfer target person, the autonomous robot 1 blends (adds) a grip operation 71 and a release operation 72 with each other in a blend ratio 76, and executes grip force control 74 based on a blending result (73). In a process in which the autonomous robot 1 releases the object B1, the blend ratio 76 is decreased, such that the autonomous robot 1 finally releases the object B1.

The blend ratio 76 may be obtained based on a result of calculating (75) a load from, for example, the sensor data (the grip force F, the rotational moment F, and the like) detected by the various sensors (the 6-axis force sensor 501, the 3-axis force sensor 502, the slip sensor 503, and the like) of the manipulator 44 after the physical interaction execution unit 55 executes the release operation.

The blend ratio obtained in such a manner is also used as a parameter in arm operation control 77. A control amount of the arm operation control 77 is determined based on the sensor data (the grip force F, the rotational moment F, and the like) detected by the various sensors (the 6-axis force sensor 501, the 3-axis force sensor 502, the slip sensor 503, and the like) of the manipulator 44 after the physical interaction execution unit 55 executes the release operation and the blend ratio 76, and a control amount of whole body operation control 78 is then determined so as to support the arm operation control 77.

1.9.1 Modification

Figure 15:
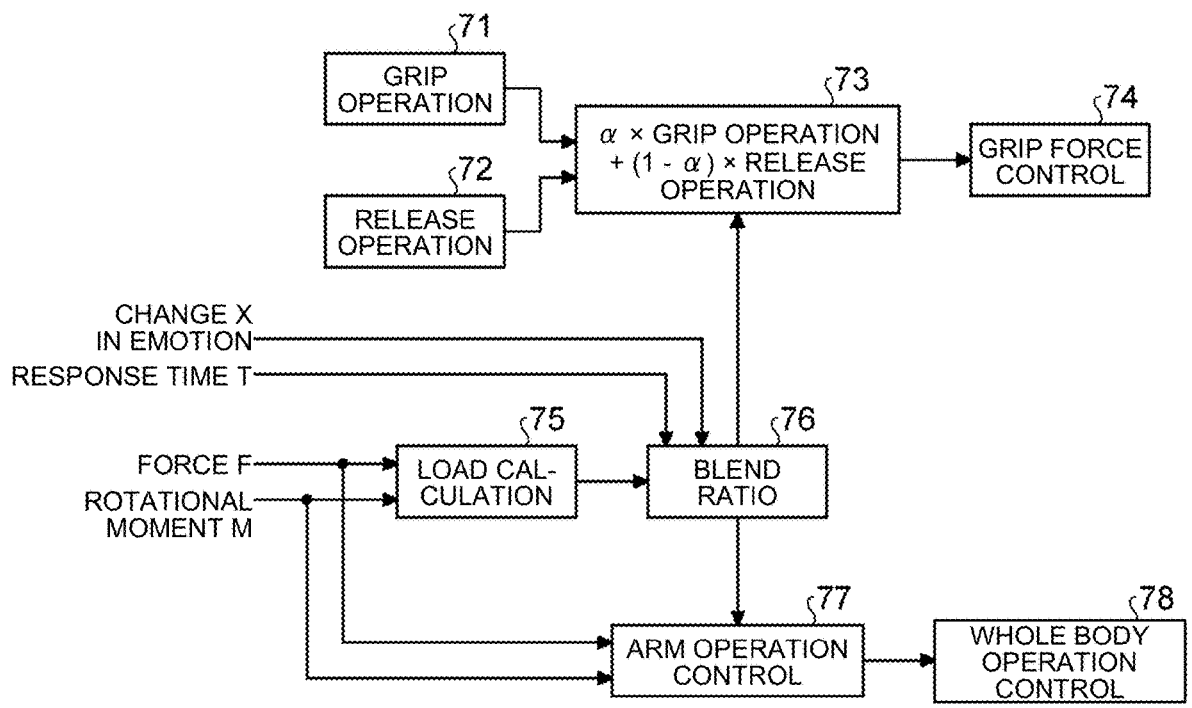
FIG. 15 is a diagram for describing a blend between a grip operation and a release operation according to a modification of the embodiment.

FIG. 15 is a diagram for describing a blend between a grip operation and a release operation according to a modification of the present embodiment. As illustrated in FIG. 15, the blend ratio 76 may be obtained based on a response time T measured by the response time measurement unit 57 or the change in the emotion of the transfer target person detected by the transfer target person recognition unit 51, in addition to the sensor data (the grip force F, the rotational moment F, and the like). Therefore, it becomes possible to adjust the blend ratio 76 so as to release the object B1 more politely or quickly, for example, in a case where the transfer target person feels uncomfortable.

1.10 With Respect to Measurement of Initial Slip

Next, measurement of initial slip will be described with specific examples.

1.10.1 Vision Sensor

Figure 16:
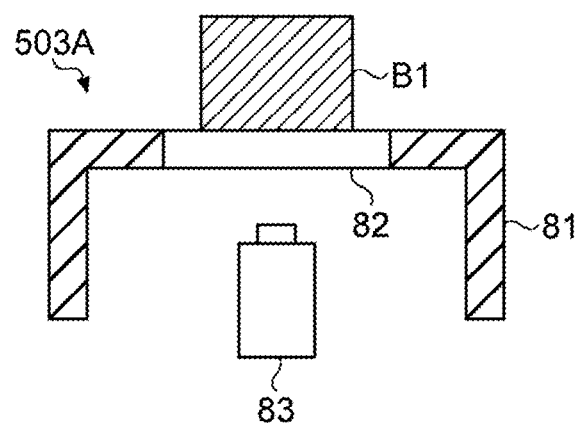
FIG. 16 is a schematic diagram illustrating an example of a slip sensor configured using a vision sensor according to the embodiment.

First, a case where a vision sensor is used as a sensor (corresponding to the slip sensor 503) for measuring initial slip will be described. FIG. 16 is a schematic diagram illustrating an example of a slip sensor configured using a vision sensor.

As illustrated in FIG. 16, a slip sensor 503A configured using a vision sensor 83 includes a deformed portion 82 provided in a part of a housing 81 of the autonomous robot 1 and the vision sensor 83 that observes deformation of the deformed portion 82 from the inside of the housing 81.

Figure 17:
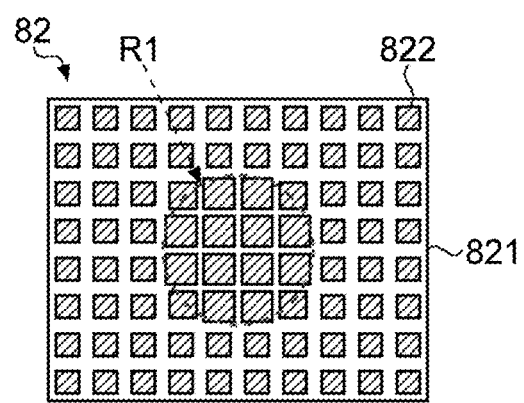
FIG. 17 is a diagram illustrating an example of a deformed portion illustrated in FIG. 16.

As illustrated in FIG. 17, the deformed portion 82 is formed of, for example, a viscoelastic body 821 such as silicone rubber or the like. The viscoelastic body 821 is provided with, for example, a plurality of markers 822 arranged in a two-dimensional lattice pattern. When a pressure is applied to a region R1 as illustrated in FIG. 17 with respect to the deformed portion 82 having such a structure, the markers 822 in the region R1 cause deformation or positional deviation. Therefore, the slip sensor 503A can specify which region a pressure is applied to, that is, which region is in contact with the object B1 by observing the region of the markers 822 that have caused the deformation or the positional deviation with the vision sensor 83.

In addition, for example, when an external force is applied to the object B1 in contact with the deformed portion 82, initial slip occurs as a stage before the object B1 actually starts slipping with respect to the deformed portion 82. The initial slip is a phenomenon in which slip occurs in a peripheral portion in a state where slip does not occur in a central portion of the contact region.

Figure 18:
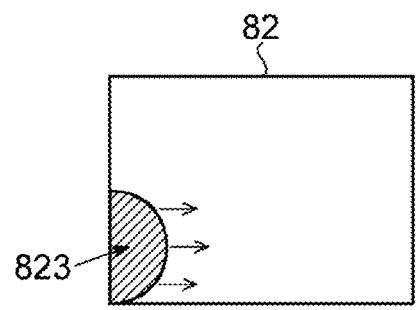
FIG. 18 is a diagram for describing initial slip detected by the vision sensor according to the embodiment (part 1).
Figure 19:
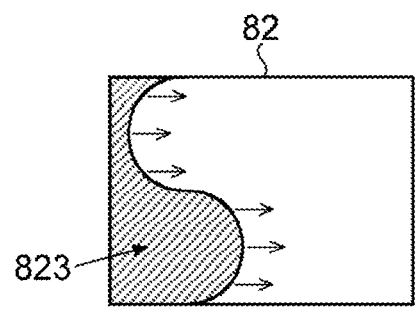
FIG. 19 is a diagram for describing initial slip detected by the vision sensor according to the embodiment (part 2).
Figure 20:
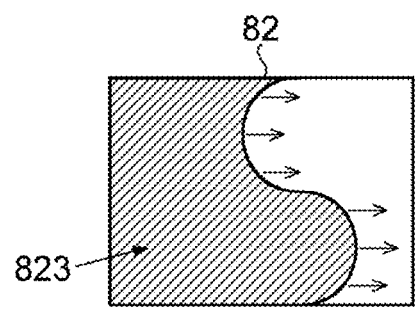
FIG. 20 is a diagram for describing initial slip detected by the vision sensor according to the embodiment (part 3).

For example, as illustrated in FIGS. 18 to 20, when an external force in a right direction in the drawings is applied to the object B1 in contact with the entire deformed portion 82, initial slip 823 occurs from a left side of the deformed portion 82 (see FIG. 18), a region of the slip is gradually expanded (see FIGS. 18 to 20), and the slip is finally detected in the entire deformed portion 82.

Therefore, in a case of using the slip sensor 503A configured using the vision sensor 83, it becomes possible to set a state in which the hand portion 443 grips and lifts the object B1 as a reference, detect initial slip in a direction opposite to gravity, a direction opposite to a rotational moment due to the gravity, or a position direction of the hand H1 of the transfer target person from this state by the slip sensor 503A, and set a timing at which the initial slip is detected as a timing at which the transfer target person starts the receiving operation.

1.10.2 Pressure Distribution Sensor

Figure 21:
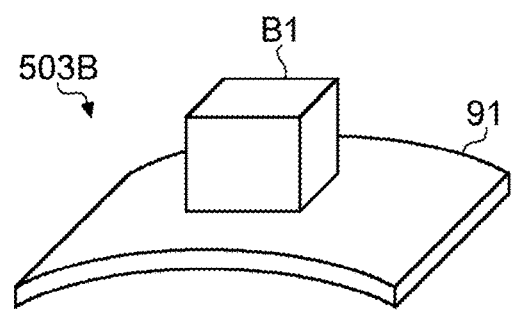
FIG. 21 is a schematic diagram illustrating an example of a slip sensor configured using a pressure distribution sensor according to the embodiment.

In addition, a pressure distribution sensor can also be used as a sensor (corresponding to the slip sensor 503) for measuring initial slip. FIG. 21 is a schematic diagram illustrating an example of a slip sensor configured using a pressure distribution sensor.

Figure 22:
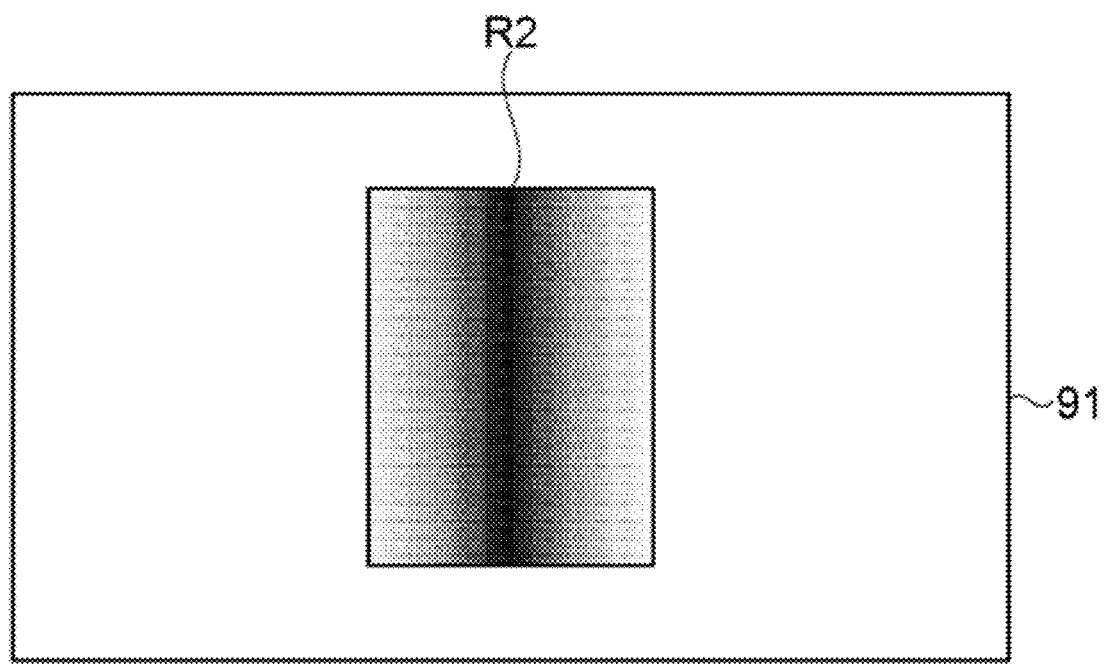
FIG. 22 is a diagram for describing initial slip detected by the pressure distribution sensor according to the embodiment (part 1).

As illustrated in FIG. 21, in a slip sensor 503B configured using a pressure distribution sensor 91, a surface in contact with the object B1 is distorted. Therefore, in a case where the object B1 is brought into contact with the slip sensor 503B, a pressure detected in a central portion of a contact region R2 becomes the highest, as illustrated in FIG. 22. Note that in FIGS. 22 and 23, it is assumed that a density of a color in the contact region R2 indicates a height of the pressure.

Figure 23:
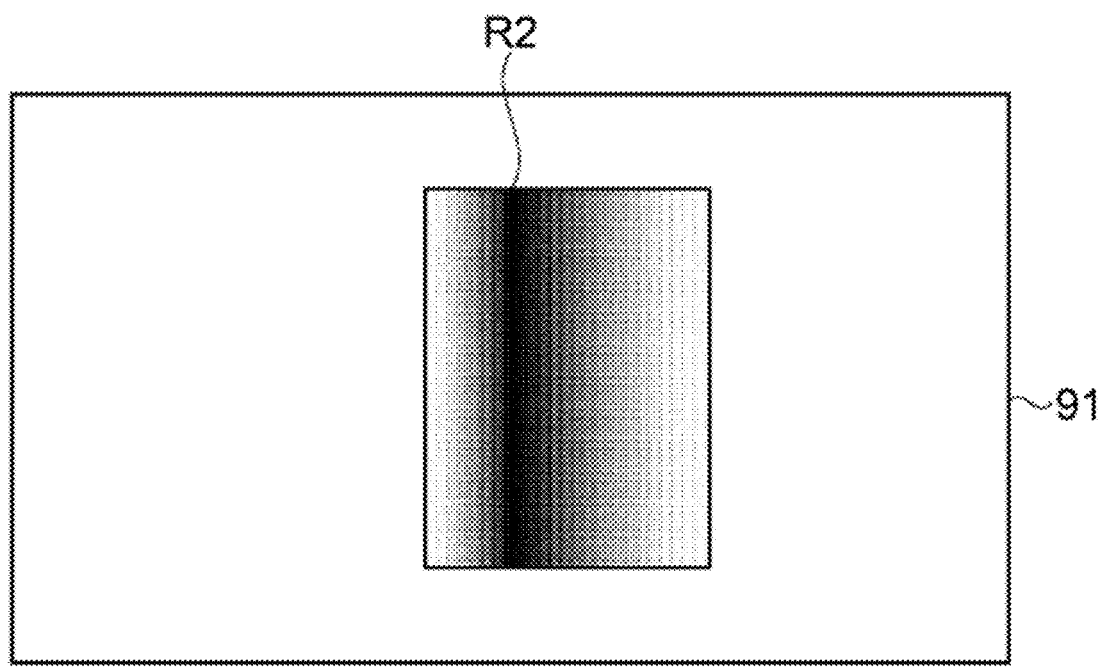
FIG. 23 is a diagram for describing initial slip detected by the pressure distribution sensor according to the embodiment (part 2).

When an external force in a right direction in the drawing is applied in this state, a region having the highest pressure in the contact region R2 does not move, but its peripheral region shifts in the right direction in the drawing, as illustrated in FIG. 23.

Therefore, in a case of using the slip sensor 503B configured using the pressure distribution sensor 91, it becomes possible to set a state in which the hand portion 443 grips and lifts the object B1 as a reference, detect initial slip in a direction opposite to gravity, a direction opposite to a rotational moment due to the gravity, or a position direction of the hand H1 of the transfer target person from this state by the slip sensor 503B, and set a timing at which the initial slip is detected as a timing at which the transfer target person starts the receiving operation.

1.11 System Configuration

Figure 24:
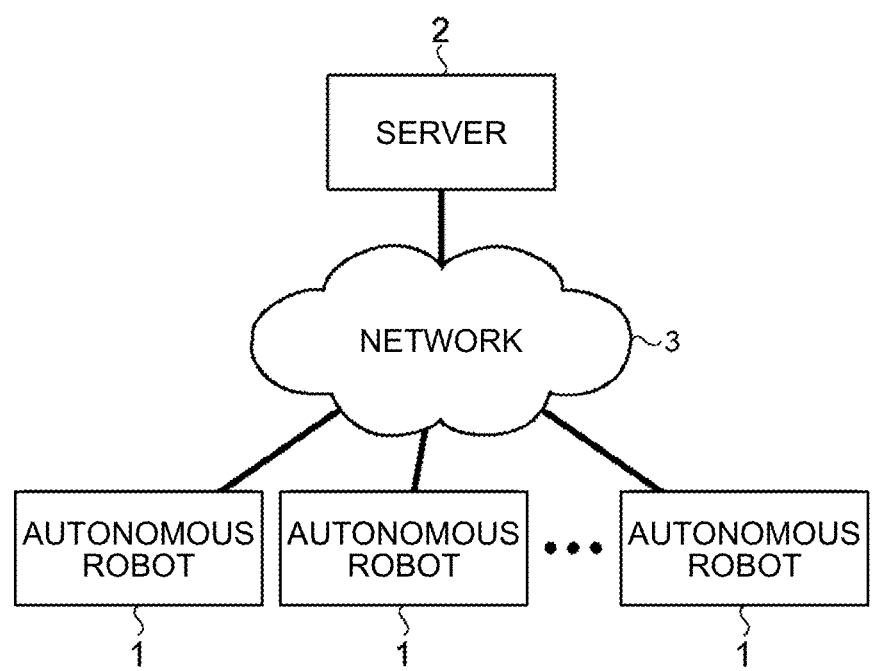
FIG. 24 is a block diagram illustrating an example of a system configuration according to the embodiment.

As illustrated in FIG. 24, the autonomous robot 1 according to the present embodiment may be connectable to a server 2 via a predetermined network 3, for example, as illustrated in FIG. 24. The server 2 may be a server group including a plurality of servers, such as a cloud server or the like, for example. As the network 3, for example, various networks such as the Internet, a LAN, a mobile communication network, or the like, can be applied.

In such a system configuration, the machine learning unit described above may be arranged in each autonomous robot 1 or may be arranged in the server 2. Note that it is preferable that a result (for example, a learned model) of machine learning by the machine learning unit can be shared by a plurality of autonomous robots 1 connected to each other via the predetermined network 3, regardless of whether the machine learning unit is arranged in each autonomous robot 1 or is arranged in the server 2.

A general-purpose computer or processor (CPU) may be used or a general-purpose computing on graphics processing units (GPGPU), a large-scale personal computer (PC), a field-programmable gate array (FPGA), or the like, may be used, as a device that realizes the machine learning unit.

1.12 Action/Effect

As described above, according to the present embodiment, by continuously measuring the change in the slip amount of the object B1 in the transfer direction A1 during the execution of the release operation, the release operation is controlled so that the continuity of the moving speed of the object B1 in the transfer direction A1 is maintained. Therefore, the sudden change in the displacement of the object B1 in the transfer direction A1 can be reduced, and it becomes thus possible to transfer the object B1 smoothly.

In addition, in the present embodiment, the machine learning using the change rate of the grip force of the hand portion 443, the information detected by the various sensors mounted on the hand portion 443, or the like, as the input and using the continuity of the moving speed of the object B1 in the transfer direction A1 as the output is performed. Therefore, it is possible to enable smoother transfer of the object B1 depending on the characteristics (the coefficient of static friction, the coefficient of dynamic friction, the mass, the shape dimension, the rigidity, the strength, the temperature, the humidity, and the like) of the object B1 and the behavior, the situation, or the like of the transfer target person.

Further, in the present embodiment, for example, the change in the slip amount or the initial slip amount of the object B1 gripped by the hand portion 443 is measured, and the release operation is started when a direction of the change has the component in the direction opposite to the gravity, the direction opposite to the rotational moment due to the gravity, or the position direction of the hand H1 of the transfer target person. Therefore, the release operation can be started at an initial stage of the transfer operation, and a fluctuation in a load applied to the object B1 or the grip force of the hand portion 443 can thus be suppressed to the minimum, such that it becomes possible to transfer the object B1 more smoothly.

Furthermore, in the present embodiment, during the execution of the release operation, the slip amount or the initial slip amount of the object B1 in the gravity direction is continuously measured. Therefore, it becomes possible to reduce an erroneous fall of the object B1 or unnatural vertical displacement of the object B1 within the hand portion 443.

Furthermore, in the present embodiment, the existence, the change in the emotion, or the like, of the transfer target person obtained from the image input information, the voice input information, or the like is added to the input and or output of the machine learning. Therefore, it is possible to achieve further improvement in a quality of the physical interaction.

Furthermore, in the present embodiment, the release operation can be started after confirming the existence of the transfer target person or the existence of the hand H1 using the result of the image processing or the information from the distance measuring sensor. Therefore, it is possible to avoid erroneously starting the release operation, and it becomes thus possible to more safely and reliably execute the transfer of the object B1. Note that the existence of the transfer target person can be confirmed using, for example, the voice input/output information or the like as well as the result of the image processing or the information from the distance measuring sensor. In addition, after the intention of the transfer target person to grip the object or the change in the emotion of the transfer target person during the release operation is recognized using the voice input/output information or the like, it becomes possible to execute the determination of the start of the release operation or the operation continuation.

Note that a case where the object B1 is gripped by one manipulator 44 and transferred to the transfer target person has been exemplified in the embodiment described above, but the present disclosure is not limited thereto. For example, the embodiment described above can be applied to a case where the object B1 is gripped using both manipulators 44R and 44L and transferred to the transfer target person, or the like.

Further, the embodiment described above can also be applied to a case where a plurality of autonomous robots 1 as well as one autonomous robot 1 lifts the object B1 and transfers the object B1 to one or more transfer target persons in cooperation with each other.

In addition, the embodiment described above can also be applied to a case where the object B1 is received from a target person.

The embodiments of the present disclosure have been described hereinabove, but the technical scope of the present disclosure is not limited to each of the embodiments described above, and various modifications can be made without departing from the gist of the present disclosure. In addition, components across different embodiments and modifications may be appropriately combined with each other.

In addition, effects in each embodiment described in the present specification are merely examples and are not limited, and other effects may be provided.

Note that the present technology can also have the following configuration.

(1)

An information processing device comprising: a control unit that controls a manipulator so that a moving speed of an object gripped by the manipulator maintains continuity when the object is transferred to a transfer target person.

(2)

The information processing device according to (1), wherein the control unit controls a change amount in a grip force of the manipulator per unit time so that the moving speed of the object in a transfer direction maintains the continuity.

(3)

The information processing device according to (1), wherein the manipulator includes a hand portion that grips the object and an arm portion having one end to which the hand portion is attached, and the control unit controls a change amount in a grip force of the hand portion per unit time and controls a change amount in a posture of the arm portion per unit time so that the moving speed of the object in a transfer direction maintains the continuity.

(4)

The information processing device according to any one of (1) to (3), wherein the manipulator is attached to a moving body that is movable, and the control unit controls the manipulator and controls movement of the moving body so that the moving speed of the object maintains the continuity.

(5)

The information processing device according to any one of (1) to (4), further comprising a first detection unit that detects a slip amount of the object at a part where the object is in contact with the manipulator, wherein the control unit controls the manipulator so that the moving speed of the object maintains the continuity, based on the slip amount detected by the first detection unit.

(6)

The information processing device according to any one of (1) to (6), further comprising a second detection unit that detects a slip amount or an initial slip amount of the object at a part where the object is in contact with the manipulator, wherein the control unit causes the manipulator to start an operation of transferring the object to the transfer target person in a case where a change in the slip amount or the initial slip amount detected by the second detection unit contains a component in a direction different from a gravity direction.

(7)

The information processing device according to (6), wherein the direction different from the gravity direction is a direction opposite to gravity, a direction opposite to a rotational moment due to the gravity, or a transfer direction to the transfer target person.

(8)

The information processing device according to any one of (1) to (7), further comprising a third detection unit that detects a slip amount or an initial slip amount of the object in a gravity direction at a part where the object is in contact with the manipulator, wherein the control unit controls the manipulator based on the slip amount or the initial slip amount in the gravity direction detected by the third detection unit.

(9)

The information processing device according to any one of (1) to (8), further comprising a target person recognition unit that recognizes an emotion of the transfer target person during an operation of transferring the object to the transfer target person, wherein the control unit stops or ends the operation of transferring the object to the transfer target person based on a change in the emotion of the transfer target person detected by the target person recognition unit.

(10)

The information processing device according to (9), wherein the target person recognition unit recognizes the emotion of the transfer target person based on at least one of image data obtained by capturing an image of the transfer target person and voice data obtained by collecting voices uttered by the transfer target person.

(11)

The information processing device according to any one of (1) to (10), further comprising a planning unit that plans a transfer operation to be executed by the manipulator in order to transfer the object to the transfer target person, wherein the control unit controls the manipulator so that the moving speed of the object maintains the continuity according to the transfer operation planned by the planning unit.

(12)

The information processing device according to (11), further comprising an object recognition unit that recognizes or estimates characteristics of the object, wherein the planning unit plans the transfer operation based on the characteristics of the object recognized or estimated by the object recognition unit.

(13)

The information processing device according to (12), wherein the characteristics of the object include at least one of a coefficient of static friction, a coefficient of dynamic friction, a mass, a shape dimension, a rigidity, a strength, a temperature, and a humidity.

(14)

The information processing device according to any one of (11) to (13), wherein the planning unit plans the transfer operation according to a learned model.

(15)

The information processing device according to (14), wherein the learned model is a model created by machine learning using a change rate of a grip force of the manipulator gripping the object as an input and using continuity of a moving speed of the object in a transfer direction as an output.

(16)

The information processing device according to (15), wherein the machine learning is machine learning in which a positive reward is set as the continuity of the moving speed of the object in the transfer direction becomes higher and a negative reward is set as the continuity of the moving speed of the object in the transfer direction becomes lower.

(17)

The information processing device according to (5), wherein the first detection unit includes at least one of a viscoelastic body, a vision sensor, a pressure distribution sensor, and a distance measuring sensor.

(18)

The information processing device according to (6) or (7), wherein the second detection unit includes a viscoelastic body and a vision sensor, or a pressure distribution sensor.

(19)

A control method comprising: controlling a manipulator so that a moving speed of an object gripped by the manipulator maintains continuity when the object is transferred to a transfer target person.

(20)

A program for causing a computer that controls a manipulator to function, the program causing the computer to execute: controlling the manipulator so that a moving speed of an object gripped by the manipulator maintains continuity when the object is transferred to a transfer target person.

REFERENCE SIGNS LIST

1 AUTONOMOUS ROBOT
2 SERVER
3 NETWORK
10 CONTROL UNIT
11 SIGNAL PROCESSING CIRCUIT
12 CPU
13 DRAM
14 FLASH ROM
15 PC CARD I/F
16 WIRELESS COMMUNICATION UNIT
17 INTERNAL BUS
18 BATTERY
19 CAMERA
20 IMU
21 ToF SENSOR
22 TOUCH SENSOR
23 MICROPHONE
24 SPEAKER
25 DISPLAY UNIT
26 MOVABLE UNIT
261 3-AXIS SENSOR (SHOULDER)
262 1-AXIS SENSOR (ELBOW)
263 3-AXIS SENSOR (WRIST)
264 1-AXIS SENSOR (KNUCKLE)
265 2-AXIS SENSOR (WAIST)
266 3-axis sensor (neck)
27 ACTUATOR
28 ENCODER (POTENTIOMETER)
30 MEMORY CARD
41 HEAD PORTION
42 BODY PORTION
43 CARRIAGE PORTION
44, 44L, 44R MANIPULATOR
441 UPPER ARM PORTION
442 FOREARM PORTION
443 HAND PORTION
444 JOINT MECHANISM
4431 BASE PORTION
4432, 4432a, 4432b FINGER PORTION
4433, 4435 JOINT MECHANISM
4434 BASE JOINT PORTION
4436 DISTAL JOINT PORTION
50 SENSOR GROUP
501 6-AXIS FORCE SENSOR
502 3-AXIS FORCE SENSOR
503, 503A, 503B SLIP SENSOR
504 DISTANCE MEASURING SENSOR
504a ToF SENSOR
504b CAMERA
51 TRANSFER TARGET PERSON RECOGNITION UNIT
52 OBJECT RECOGNITION UNIT
53 TRANSFER ACTION PLANNING UNIT
54 LEARNING INFORMATION STORAGE UNIT
55 PHYSICAL INTERACTION EXECUTION UNIT
56 GRIP INFORMATION ACQUISITION UNIT
57 RESPONSE TIME MEASUREMENT UNIT
58 EMOTION MAP GENERATION UNIT
59 TRANSFER ACTION EVALUATION UNIT
60 NODE (NEURON)
61 EDGE
71 GRIP OPERATION
72 RELEASE OPERATION
73 $\alpha \times$GRIP OPERATION$+(1-\alpha)\times$RELEASE OPERATION
74 GRIP FORCE CONTROL
75 LOAD CALCULATION
76 BLEND RATIO
77 ARM OPERATION CONTROL
78 WHOLE BODY OPERATION CONTROL
81 HOUSING
82 DEFORMED PORTION
83 VISION SENSOR
821 VISCOELASTIC BODY
822 MARKER
823 INITIAL SLIP
91 PRESSURE DISTRIBUTION SENSOR
A1 TRANSFER DIRECTION
B1 OBJECT
H1 HAND
P1 FLOOR
R1 REGION
R2 CONTACT REGION

The invention claimed is:

1. An information processing device comprising:
a control unit configured to control a moving body that is movable and a manipulator attached to the moving body so that a moving speed of an object gripped by the manipulator maintains continuity based on the object being transferred to a transfer target person and both the manipulator and the transfer target person gripping the object at a same time, wherein
the control unit is implemented via at least one processor.

2. The information processing device according to claim 1, wherein the control unit is further configured to control a change amount in a grip force of the manipulator per unit time so that the moving speed of the object in a transfer direction maintains the continuity.

3. The information processing device according to claim 1,
wherein the manipulator includes a hand portion that grips the object and an arm portion having one end to which the hand portion is attached, and
the control unit is further configured to control a change amount in a grip force of the hand portion per unit time and controls a change amount in a posture of the arm portion per unit time so that the moving speed of the object in a transfer direction maintains the continuity.

4. The information processing device according to claim 1, further comprising
a first detection unit configured to detect a slip amount of the object at a part where the object is in contact with the manipulator,
wherein the control unit is further configured to control the manipulator so that the moving speed of the object maintains the continuity, based on the slip amount detected by the first detection unit, and
the first detection unit is implemented via at least one processor.

5. The information processing device according to claim 4, wherein the first detection unit includes at least one of a viscoelastic body, a vision sensor, a pressure distribution sensor, and a distance measuring sensor.

6. The information processing device according to claim 1, further comprising
a second detection unit configured to detect a slip amount or an initial slip amount of the object at a part where the object is in contact with the manipulator,
wherein the control unit is further configured to cause the manipulator to start an operation of transferring the object to the transfer target person in a case where a change in the slip amount or the initial slip amount detected by the second detection unit contains a component in a direction different from a gravity direction, and
the second detection unit is implemented via at least one processor.

7. The information processing device according to claim 6, wherein the direction different from the gravity direction is a direction opposite to gravity, a direction opposite to a rotational moment due to the gravity, or a transfer direction to the transfer target person.

8. The information processing device according to claim 6, wherein the second detection unit includes a viscoelastic body and a vision sensor, or a pressure distribution sensor.

9. The information processing device according to claim 1, further comprising
a third detection unit configured to detect a slip amount or an initial slip amount of the object in a gravity direction at a part where the object is in contact with the manipulator,
wherein the control unit is further configured to control the manipulator based on the slip amount or the initial slip amount in the gravity direction detected by the third detection unit, and
the third detection unit is implemented via at least one processor.

10. The information processing device according to claim 1, further comprising
a target person recognition unit configured to recognize an emotion of the transfer target person during an operation of transferring the object to the transfer target person,
wherein the control unit is further configured to stop or end the operation of transferring the object to the transfer target person based on a change in the emotion of the transfer target person detected by the target person recognition unit, and
the target person recognition unit is implemented via at least one processor.

11. The information processing device according to claim 10, wherein the target person recognition unit is further configured to recognize the emotion of the transfer target person based on at least one of image data obtained by capturing an image of the transfer target person and voice data obtained by collecting voices uttered by the transfer target person.

12. The information processing device according to claim 1, further comprising
a planning unit configured to plan a transfer operation to be executed by the manipulator in order to transfer the object to the transfer target person,
wherein the control unit is further configured to control the manipulator so that the moving speed of the object maintains the continuity according to the transfer operation planned by the planning unit, and
the planning unit is implemented via at least one processor.

13. The information processing device according to claim 12, further comprising
an object recognition unit configured to recognize or estimate characteristics of the object,
wherein the planning unit is further configured to plan the transfer operation based on the characteristics of the object recognized or estimated by the object recognition unit, and
the object recognition unit is implemented via at least one processor.

14. The information processing device according to claim 13, wherein the characteristics of the object include at least one of a coefficient of static friction, a coefficient of dynamic friction, a mass, a shape dimension, a rigidity, a strength, a temperature, and a humidity.

15. The information processing device according to claim 12, wherein the planning unit is further configured to plan the transfer operation according to a learned model.

16. The information processing device according to claim 15, wherein the learned model is a model created by machine learning using a change rate of a grip force of the manipulator gripping the object as an input and using continuity of a moving speed of the object in a transfer direction as an output.

17. The information processing device according to claim 16, wherein the machine learning is machine learning in which a positive reward is set as the continuity of the moving speed of the object in the transfer direction becomes higher and a negative reward is set as the continuity of the moving speed of the object in the transfer direction becomes lower.

18. The information processing device according to claim 1, wherein
the control unit is further configured to control the manipulator and control movement of the moving body at a same time so that the moving speed of the object maintains the continuity.

19. The information processing device according to claim 1, wherein
the control unit is further configured to control the manipulator and control movement of the moving body at a same time so that the moving speed of the object maintains the continuity based on the control of the manipulator and the control movement of the moving body being blended with one another in a predetermined blend ratio.

20. A control method comprising:
controlling a moving body that is movable and a manipulator attached to the moving body so that a moving speed of an object gripped by the manipulator maintains continuity based on the object being transferred to a transfer target person and both the manipulator and the transfer target person gripping the object at a same time.

21. A non-transitory computer-readable medium having embodied thereon a program, which when executed by a computer causes the computer to execute a control method, the method comprising:
  controlling a moving body that is movable and a manipulator so that a moving speed of an object gripped by the manipulator maintains continuity based on the object being transferred to a transfer target person and both the manipulator and the transfer target person gripping the object at a same time.

* * * * *